US009549224B2

(12) United States Patent
Jensen et al.

(10) Patent No.: US 9,549,224 B2
(45) Date of Patent: Jan. 17, 2017

(54) METHODS AND SYSTEMS FOR PRESENTING SUPPLEMENTAL CONTENT IN MEDIA ASSETS

(71) Applicant: United Video Properties, Inc., Santa Clara, CA (US)

(72) Inventors: Paul Jensen, Menlo Park, CA (US); Jaya Bhagavathula, San Diego, CA (US)

(73) Assignee: Rovi Guides, Inc., San Carlos, CA (US)

( * ) Notice: Subject to any disclaimer, the term of this patent is extended or adjusted under 35 U.S.C. 154(b) by 449 days.

(21) Appl. No.: 13/961,145

(22) Filed: Aug. 7, 2013

(65) Prior Publication Data

US 2015/0042682 A1 Feb. 12, 2015

(51) Int. Cl.
*G09G 5/00* (2006.01)
*H04N 21/81* (2011.01)
*G06T 19/00* (2011.01)
*H04N 21/4415* (2011.01)

(52) U.S. Cl.
CPC ........... *H04N 21/812* (2013.01); *G06T 19/006* (2013.01); *H04N 21/4415* (2013.01); *H04N 21/816* (2013.01); *H04N 21/8146* (2013.01)

(58) Field of Classification Search
CPC ................ G06T 19/006; H04N 13/047; H04N 21/488–21/4888; H04N 21/8126–21/8133; H04N 21/8146; H04N 21/816
See application file for complete search history.

(56) References Cited

U.S. PATENT DOCUMENTS 6,212,007 B1 * 4/2001 Hentschke ............. G02B 27/22 359/463
6,985,290 B2 * 1/2006 Putilin ............... G02B 27/2214 348/E13.029
8,947,512 B1 * 2/2015 Johnston ............ H04N 13/0033 348/56
2005/0058435 A1 3/2005 Chung et al.
2010/0007582 A1 * 1/2010 Zalewski ................ A63F 13/00 345/8
2010/0188488 A1 7/2010 Birnbaum et al.
2011/0159929 A1 6/2011 Karaoguz et al.
2011/0285905 A1 11/2011 Muikaichi et al.
2012/0154553 A1 6/2012 Zustak et al.
2013/0094069 A1 * 4/2013 Lee .......................... G03H 1/02 359/3

OTHER PUBLICATIONS

Blanche et al., "Holographic three-dimensional telepresence using large-area photorefractive polymer," Nature, vol. 468(7320): 80-83 (2010).
International Search Report, PCT/US2014/049894, dated Nov. 19, 2014.

* cited by examiner

*Primary Examiner* — Charles Tseng
(74) *Attorney, Agent, or Firm* — Ropes & Gray LLP

(57) ABSTRACT

Methods and systems are provided herein for presenting supplemental content in media assets, which may be presented only to particular users, irrespective of whether or not other users are viewing the same media asset on the same device.

20 Claims, 10 Drawing Sheets

600

METHODS AND SYSTEMS FOR PRESENTING SUPPLEMENTAL CONTENT IN MEDIA ASSETS

BACKGROUND OF THE INVENTION

While the amount and variety of media assets available to users has increased exponentially over the last decade, personalizing any particular media asset based on a particular user is still a key concern of both advertisers and content providers. For example, by targeting advertisements to particular users or supplying additional content with media assets based on whether or not a user typically enjoys media content of that type, an advertiser and/or content provider increases the likelihood that the advertisement or additional content will be well received by the users. Furthermore, whether by adding subtitles, widgets, or other features, the ability to customize media assets also enhances the media experience of the users. The drawback to targeting and adding additional content based on a particular user is that users often watch media assets together in which case some users may not want advertisements and/or additional content or may want different advertisements and/or additional content.

SUMMARY

Accordingly, methods and systems are provided herein for presenting supplemental content in various media systems, which may be presented only to particular users, irrespective of whether or not other users are viewing the same media asset on the same device. Advantageously, one user is not distracted by the supplemental content displayed to another user. In addition one user may receive supplemental content, while a different user, viewing the same media asset, simultaneously receives different supplemental content.

For example, a media guidance application is disclosed herein that presents supplemental content to only users in particular viewing directions in holographic media systems. A media guidance application is also disclosed herein that presents supplemental content to only users with optical user devices using a particular synchronization scheme.

In some aspects, a media guidance application, implemented on a holographic media system, may present a single instance of media content by combining multiple frames, in which each of the multiple frames corresponds to the same instance of the media content, but displays the media content from a different viewing direction. Additionally, the media guidance application may add supplemental content (e.g., subtitles, advertisements, etc.) to one or more of the multiple frames such that a user viewing the media content from the viewing direction associated with the one or more frames views the supplemental content as overlaid on the media content.

For example, the media content may be composed of a plurality of frames, in which a first frame of the plurality of frames includes first supplemental content and a second frame of the plurality of frames includes second supplemental content. The media guidance application may select, based on a user criterion (e.g., a media interest of the user, a user selection indicating a desire to view particular content, a recommendation from a remote location, etc.) whether or not to present the first supplemental content or the second supplemental content to a user. In response to the selection, the media guidance application determines a viewing direction in which the selected first supplemental content or the selected second supplemental content is presented to the user, and the media guidance application generates a display of the selected first supplemental content or the selected second supplemental content at the determined viewing direction simultaneously with the media asset.

In some aspects, a media guidance application generates a display of media content that is perceived by the user as including a 3D effect when viewed using an optical user device. For example, by showing a viewer media content from slightly different angles while using an optical user device that rapidly allows and restricts a viewers eyesight, the parallax caused by the different angles, causes a user to perceive a 3D effect.

The media guidance application may synchronize the optical user device, which may be configured as headwear (e.g., glasses) with a first and second shutter to open and close, to allow or prevent the user from seeing a frame of the media content. In addition to generating the perceived 3D effect, the synchronization scheme determined by the media guidance application may also cause a user to perceive supplemental content overlaid on the media content.

For example, the media guidance application may receive media content, comprising a plurality of frames, in which a first frame of the plurality of frames includes first supplemental content and a second frame of the plurality of frames includes second supplemental content. The media guidance application may select, based on a user criterion (e.g., a media interest of the user, a user selection indicating a desire to view particular content, a recommendation from a remote location, etc.), whether to present the first supplemental content or the second supplemental content to a user. In response to selecting the first supplemental content, the media guidance application determines a synchronization scheme for the optical user device in which the first supplemental content in the first frame of the plurality of frames is presented to the user with the media asset and the second supplemental content in the second frame of the plurality of frames is not presented to the user.

In some aspects, the supplemental content, which may be presented as a series of frames, may correspond to a series of frames of the media content. In addition, the supplemental content may be requested by the user or automatically generated by the media guidance application. For example, the media guidance application may select the supplemental content by cross-referencing various supplemental content with user preferences to find supplemental content that corresponds to the user preferences.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
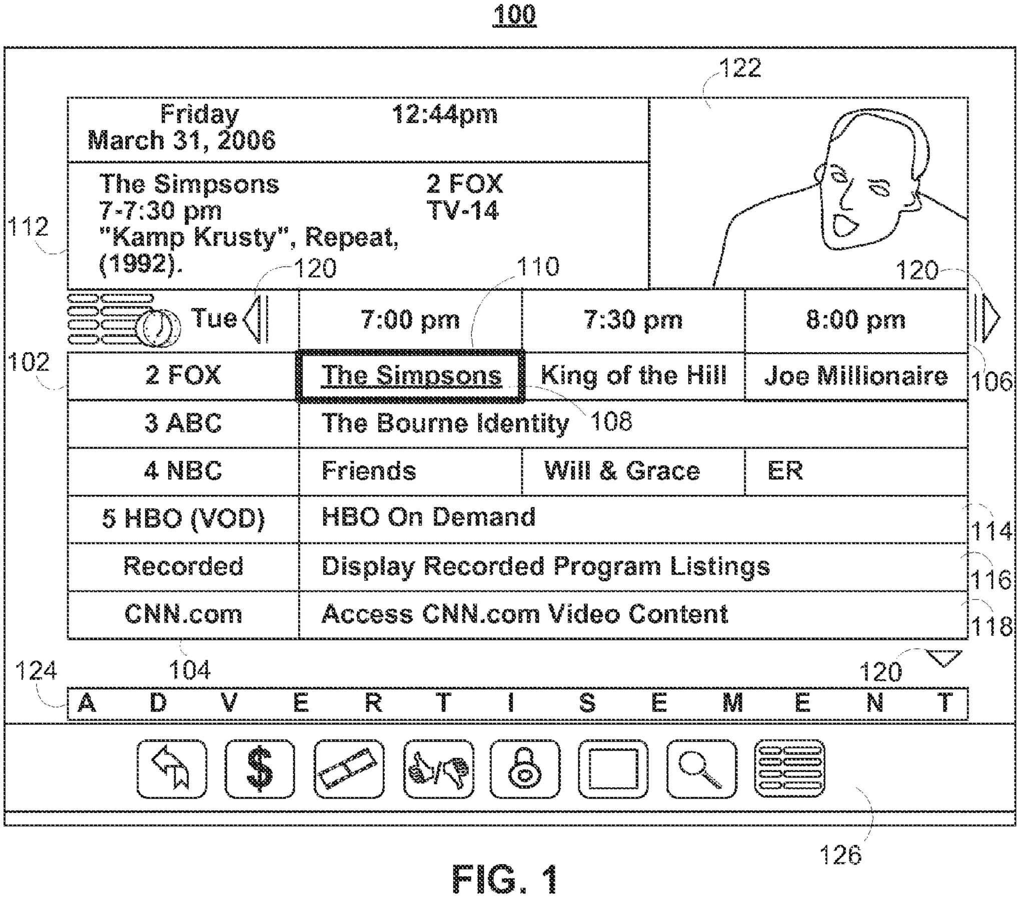
FIG. 1 shows an illustrative media guidance application for selecting media assets in accordance with some embodiments of the disclosure.

Methods and systems are provided herein for presenting supplemental content in various media systems, which may be presented only to particular users, irrespective of whether or not other users are viewing the same media asset on the same device. For example, in holographic and some 3D media systems different frames of a single instance of a media asset may be shown to different users. For example, in a holographic media system each user views a frame associated with a viewing direction of the user, while in the 3D media system disclosed below each user views a frame of a media asset associated with a synchronization scheme of an optical user device worn by a user.

As referred to herein, "supplemental content" refers to any content that is generated for consumption by a user during the presentation of a media asset. For example, supplemental content may include, but is not limited to, subtitles, media guidance data, descriptions, and/or information about objects or entities shown and/or described in a media asset. For example, supplemental content may include an advertisement about a product appearing in the media content, may refer to news and/or social media updates, and/or any other information a user may be interested in receiving during the presentation of the media content.

As referred to herein, an "instance" of media content refers to a finite point in the progression of a presentation of a media asset. For example, in traditional 2D programming, an instance of the media asset may correspond to a frame of the programming. In holographic media content and in some 3D media systems an instance may include several frames corresponding to different viewing directions (e.g., images of an object captured from different angles). The frames may be displayed simultaneously (e.g., in holographic systems) or substantially simultaneously (e.g., in some 3D media systems.

In holographic media systems images from supplemental content may be overlaid on a frame of a media asset that is displayed to a user. Because in a hologram a first user only sees a frame associated with his/her viewing direction, supplemental content may be overlaid on that frame. A second user viewing from a different viewing direction does not see the same frame as the first user; therefore, the presence of the supplemental content on the frame viewed by the first user does not create an obstruction to the second user.

For example, a hologram is composed of light interference patterns recorded on a medium (e.g., a holographic film). To generate the light interference patterns on the film, a light source is split into multiple beams and scattered off an object and a recording medium. As a result of the scattering, the light beam becomes out of phase, which gives rise to holographic "fringes" recorded in the medium. When light is subsequently applied to the medium, the fringes provide three-dimensional depth.

By using a recording medium that is dynamically updatable (e.g., may reproduce multiple recorded light fields in series), a media guidance application may generate a holographic media asset. Photorefractive polymers, which may be used as dynamically updatable recording mediums are described in greater detail in Blanche et al., "Holographic three-dimensional telepresence using large-area photorefractive polymer," Nature, 468, 80-83 (Nov. 4, 2010), which is hereby incorporated by reference herein in its entirety.

In some of the 3D media systems discussed below, an optical user device (e.g., glasses worn by a user) rapidly opens and shuts shutters (e.g., correspond to the right and left eye of a user) on the optical user device such that only a single eye of a user may view media content ay any one time. However, because that opening and closing of the shutters is at such a high speed, a user does not notice any obstruction to his/her viewing of a media asset. Instead, the media content appears as a seamless progression.

Furthermore, by synchronizing the opening and closing of the optical user device, a media guidance application may generate a media asset that displays supplemental content in a series of frames that is seen by only a single user of the multiple users viewing the same media asset. For example, by doubling the number of frames in a traditional media asset (and doubling the frame rate), the media guidance application may alternative between a frame of a presentation of the media asset with supplemental content and a frame of the presentation of the media asset without the supplemental content. A user that wishes to view the supplemental content varies a synchronization scheme associated with his/her optical user device such that the alternating frame of the media asset without the supplemental content is blocked, while the media asset with the supplemental content is shown.

As used herein, a "synchronization scheme" refers to a predetermined sequence, often in the form of a repeated pattern, associated with an optical user device for use in generating a 3D effects when viewing a media asset. For example, a synchronization scheme may determine the ordering and timing of the opening and closing of the shutters (e.g., shutter 902 and shutter 904 (FIGS. 9A-D) below) associated with a right and left eye of a user, or the display of frames in a media asset. For example, in some embodiments, the media guidance application may determine/vary the synchronization scheme used to display a media asset based on the synchronization scheme of an optical user device used to view the media asset and/or determine/vary the synchronization scheme used by the optical user device to view the media asset.

A 3D media system as described herein may also be known as a active shutter 3D system. An active shutter 3D system works by openly presenting the image intended for the left eye while blocking the right eye's view, then presenting the right-eye image while blocking the left eye, at a speed high enough to not be perceived by human sight, thus allowing the images to be perceived as fused into a single 3D image. Active shutter 3D systems are described in greater detail in Ueki et al. U.S. Patent App. Pub. No. 2013/0063670, filed Mar. 18, 2001 and Lo U.S. Patent App. No. 2012/0086776, filed Oct. 8, 2010 which are hereby incorporated by reference herein in their entireties.

In some embodiments, a synchronization scheme may also apply to the polarization of supplemental content and/or a frame of a media asset. In some embodiments, a media guidance application may polarize the light associated with supplemental content and/or a frame of a media asset such that only particular users can see the supplemental content. For example, supplemental content and/or a frame of a media asset polarized ninety degrees to that of an optical user device (e.g., shutter-less glasses) will not be seen by a user, whereas supplemental content and/or a frame of a media asset polarized at zero degrees will be seen by a user. In such systems, the media guidance application may generate for display a first media asset and a second media asset, which includes supplemental content, the first media asset and the second media asset may be presented polarized ninety degrees from each other. The media guidance application may then synchronize the polarization of an optical user device based on whether or not the user wishes to view the supplemental content.

For example, in some embodiments, media content may be composed of a plurality of frames, in which a first frame of the plurality of frames includes first supplemental content and a second frame of the plurality of frames includes second supplemental content, and in which the first and second frames are polarized at ninety degrees. The media guidance application may select, based on a user criterion (e.g., a media interest of the user, a user selection indicating a desire to view particular content, a recommendation from a remote location, etc.) whether or not to present the first supplemental content or the second supplemental content to a user. In response to the selection, the media guidance application determines a polarization in which the selected first supplemental content or the selected second supplemental content is presented to the user, and the media guidance application synchronizes the polarization of an optical user device to the polarization of the selected first supplemental content or the selected second supplemental content at the determined polarization.

It should be noted that any embodiment described herein relating to one method of stereoscopic technique may be applied to any other stereoscopic technique. For example, the methods and systems described herein related to active shutter systems and/or polarization systems may also be applied to interference filter systems, color anaglyph systems, chromadepth systems, and/or any other technique for creating or enhancing the illusion of depth in an image In some embodiments, to determine whether or not to display supplemental content and/or to determine which particular supplemental content to display, the media guidance application compares the available supplemental content to a user criterion associated with the user. As used herein, the phrase "user criterion" or "user criteria" refers to any characteristic which affects the likelihood that would affect a decision of a user regarding whether or not to view supplemental content and/or whether or not to view a particular type of supplemental content.

For example, a user criterion may include the presence of particular content (e.g., an actor, an exciting scene, a plot-twist, or any other attribute related to content or context) of the media asset, or may include an indication that the user may prefer to view the supplemental content and/or the media asset with the supplemental content (e.g., a user input requesting to view supplemental content with the media asset).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
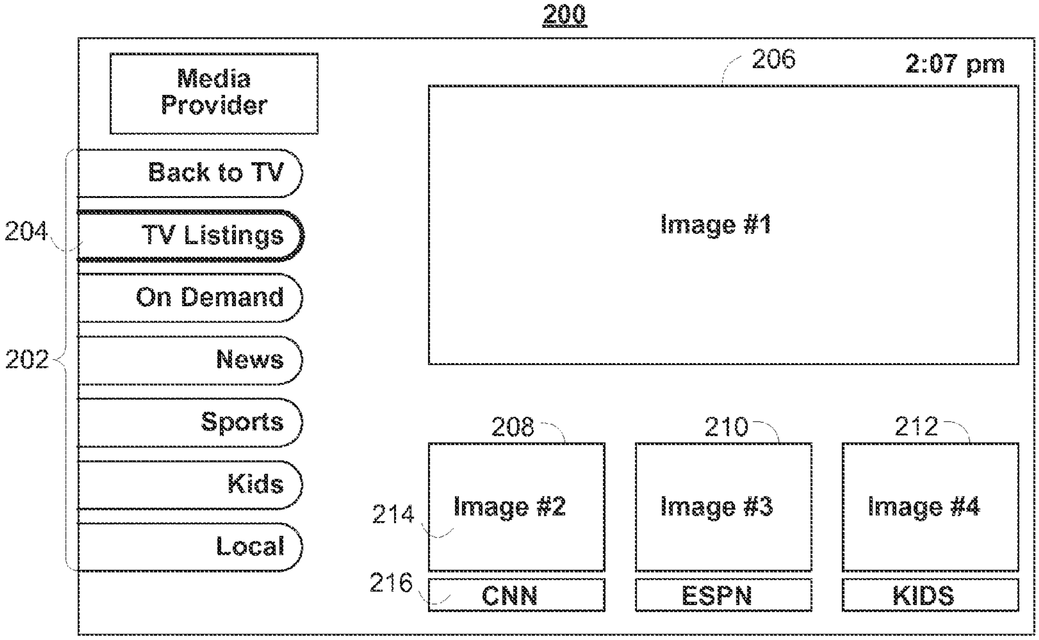
FIG. 2 shows another illustrative media guidance application for selecting media assets in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
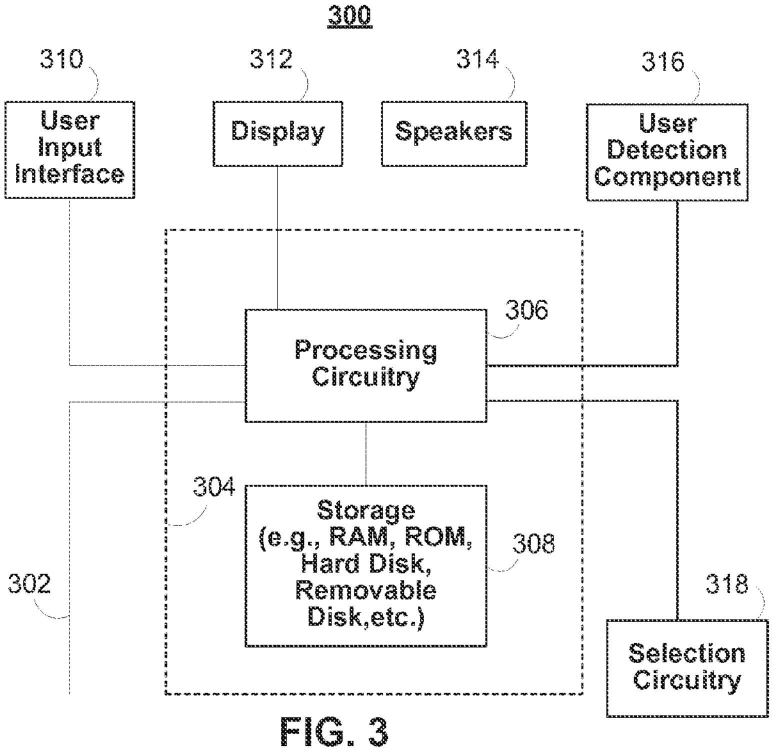
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. In addition, the generalized embodiments of user equipment device 300 may also be applied to the specialized devices of FIG. 6 (e.g., user device 602) and FIG. 9 (e.g., optical user device 900). For example, in some embodiments, a media guidance application may be implemented user device 602 (FIG. 6) and/or optical device 900 (FIGS. 9A-D), in which case user device 602 (FIG. 6) and/or optical device 900 (FIGS. 9A-D) may include one or more of the features described in FIGS. 3-4.

User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to user detection component 316. User detection component 316 may further include various components (e.g., a video detection component, an audio detection component, etc.). In some embodiments, user detection component 316 may include components that are specialized to generate particular information (e.g., the location, position, and/or viewing direction of one or more users).

For example, as discussed below in relation to FIG. 5, user detection component 316 may include an eye contact detection component, which determines or receives a location upon which one or both of a user's eyes are located. The location of a user's eyes is referred to herein as the user's "gaze point." It should be noted that as discussed herein a location of a user may in some cases be synonymous with a gaze point of a user. For example, when the media guidance application determines (e.g., via user detection component 316), the location of a user, the media guidance application may be basing the location of the user on the location of the gaze point of the user.

In some embodiments, the eye contact detection component may monitor one of both eyes of a user of user equipment 300 to identify a gaze point on display 312 for the user. The eye contact detection component may additionally or alternatively determine whether one or both eyes of a user are focused on a location (e.g., a user device generating media content) as well as the location (e.g., via a spatial detection component) and the identity (e.g., via an optical recognition module) of the user. In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of user detection component 316 and may be a separate device or system in communication with user equipment device 300.

User detection component 316 may also include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to identify individual scenes, segments, and/or any other characteristic of a media asset or an image (e.g., of a location). For example, the media guidance application may receive a media asset in the form of a video (e.g., an audio/video recording of a user). The video may include a series of frames. For each frame of the video, the media guidance application may use an object recognition module to identify objects (e.g., a user) in the frame. In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text in order to identify objects.

In addition, the media guidance application may use multiple types of optical character recognition and/or fuzzy logic, for example, when analyzing subtitles (e.g., in order to determine the content of the media asset) or comparing multiple data fields (e.g., as contained in databases described herein). For example, the media guidance application may arrange data into data fields (e.g., of database 550 (FIG. 5)) and cross-reference the data fields with other data fields (e.g., in a look-up table database). Using fuzzy logic, the system may determine two fields and/or values to be identical even though the substance of the data field or value (e.g., two different spellings) is not identical. In some embodiments, the system may analyze particular data fields of a database for particular values or text. Furthermore, the data fields could contain values (e.g., the data fields could be expressed in binary or any other suitable code or programming language) other than human-readable text.

User device 300 may also include selection circuitry 318. In some embodiments (e.g., as described in FIGS. 9A-D and 12 below), selection circuitry 318 may include a multiplexer for combining multiple media asset into a single media asset. In addition, as discussed below, selection circuitry 318 may also be used by a media guidance application to ensure that an optical user device and a user equipment device are in phase (i.e., share a synchronization scheme). Furthermore, in some embodiments, selection circuitry 318 may communicate with an optical user device (e.g., optical user device 900 (FIG. 9)) in order to determine/maintain a synchronization scheme. As such, selection circuitry 318, which may be accessible by, or incorporated into the media guidance application (e.g., via control circuitry 304 (FIG. 3)) may communicate with an optical user device via the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), short-range point-to-point communication paths, such as USB cables, IEEE 1394 cables, wireless paths (e.g., Bluetooth, infrared, IEEE 802-11x, etc.), or any other suitable wired or wireless communications path or combination of such paths.

Selection circuitry 318 may also incorporate and/or have access to a clock, which enables a media guidance application to ensure that an optical user device and a user equipment device are in synch (e.g., both refresh at 120 Hz). The media guidance application may also transmit a clock signal to various other devices (e.g., a multiplexer as described in FIG. 12 below). For example, selection circuitry 318 ensures that an open operation performed by the optical user device occurs on, and lasts the duration of, a single refresh (e.g., the display of a first frame) on the user equipment device for content the user wishes to view. Likewise, selection circuitry 318 ensures that a close operation performed by the optical user device occurs on, and lasts the duration of, a single refresh (e.g., the display of a second frame) on the user equipment device for content the user wishes to view.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
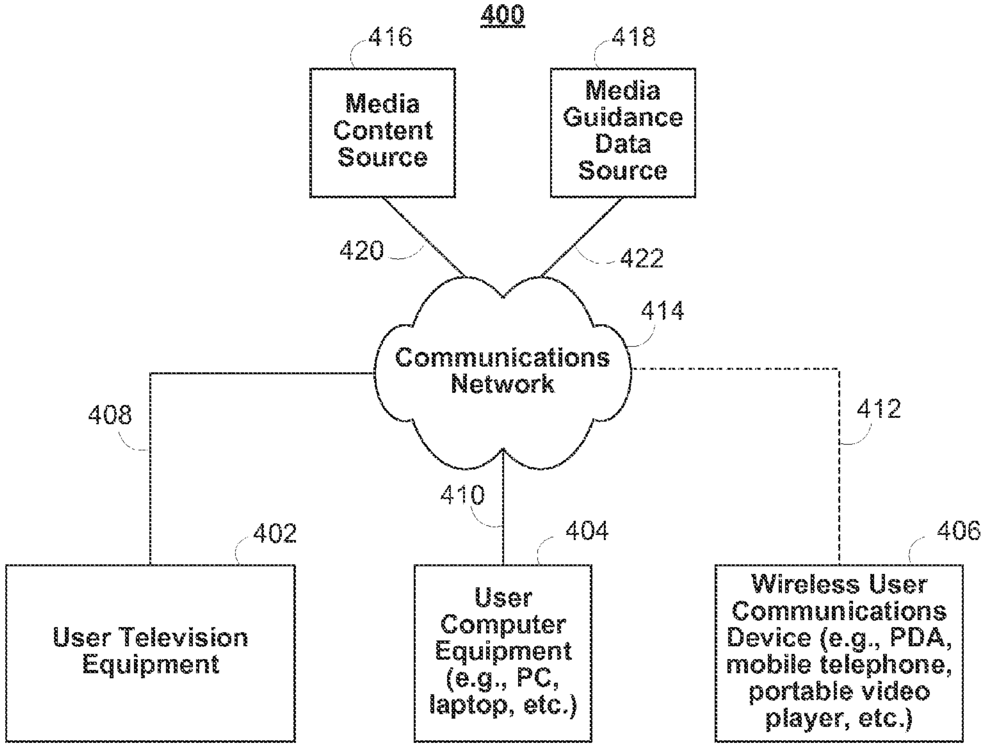
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplemental content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
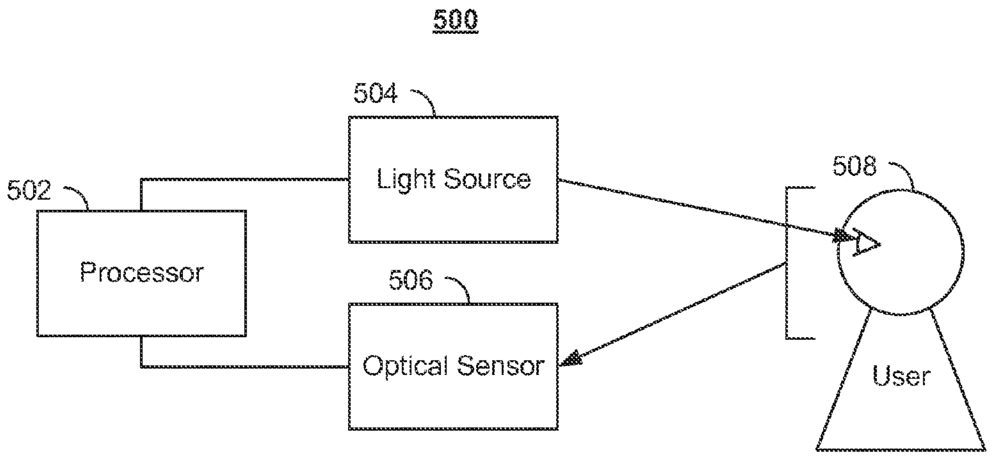
FIG. 5 is an illustrative example of a user detection component, which may be accessed by a media application in accordance with some embodiments of the disclosure.

FIG. 5 is an illustrative example of one component of a user detection component (e.g., user detection component 316 (FIG. 3)), which may be accessed by a media application in accordance with some embodiments of the disclosure. FIG. 5 shows user detection component 500, which may be used to identify the gaze point of a user of user device 300, in order to determine the identity (e.g., in order to retrieve a user profile) and/or the position (e.g., in order to determine a viewing distance of the user). User detection component 500 includes processor 502, light source 504, and optical sensor 506. Light source 504 transmits light that reaches at least one eye of a user, and optical sensor 506 is directed at the user to sense reflected light. Optical sensor 506 transmits collected data to processor 502, and based on the data received from optical sensor 506, processor 502 determines a user's gaze point.

In some embodiments, user detection component 500 is configured for determining a gaze point of a single user. In other embodiments, user detection component 500 may determine gaze points for a plurality of users (e.g., user 102, user 104, user 106, user 108, and user 110 (FIG. 1)). User detection component 500 may identify multiple users of user equipment device 300 as well as identify the identities of particular user (e.g., via optical recognition techniques).

Processor 502 may be integrated with one or more light sources 504 and one or more optical sensors 506 in a single device. Additionally or alternatively, one or more light sources 504 and one or more optical sensors 506 may be housed separately from processor 502 and in wireless or wired communication with processor 502. One or more of processors 502, light sources 504, and optical sensors 506 may be integrated into user equipment device 300.

Processor 502 may be similar to processing circuitry 306 described above. In some embodiments, processor 502 may be processing circuitry 306, with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the reflection from the outer surface of the cornea (i.e. a first Purkinje image), the reflection from the inner surface of the cornea (i.e. a second Purkinje image), the reflection from the outer (anterior) surface of the lens (i.e. a third Purkinje image), and/or the reflection from the inner (posterior) surface of the lens (i.e. a fourth Purkinje image).

Optical sensor 506 collects visual information, such as an image or series of images, of one or both of one or more users' eyes. Optical sensor 506 transmits the collected image(s) to processor 502, which processes the received image(s) to identify a glint (i.e. corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the gaze point. Processor 502 may also store or obtain information describing the location of one or more light sources 504 and/or the location of one or more optical sensors 506 relative to display 312. Using this information, processor 502 may determine a user's gaze point on display 312.

In some embodiments, user detection component 500 performs best if the position of a user's head is fixed or relatively stable. In other embodiments, user detection component 500 is configured to account for a user's head movement, which allows the user a more natural viewing experience than if the user's head were fixed in a particular position. In some embodiments, the media guidance application may be configured to track a user. For example, if a user moves from an initial position (e.g., associated with one viewing direction) to a different position (e.g., associated with a different viewing direction), the media guidance application may detect the movement and adjust the presentation of the media and supplemental content (e.g., change the viewing direction associated with supplemental content corresponding to the user) accordingly.

In some embodiments accounting for a user's head movement, user detection component 500 includes two or more optical sensors 506. For example, two cameras may be arranged to form a stereo vision system for obtaining a 3D position of the user's eye or eyes; this allows processor 502 to compensate for head movement when determining the user's gaze point. The two or more optical sensors 506 may be part of a single unit or may be separate units. For example, user equipment device 300 may include two cameras used as optical sensors 506, or user detection component 500 in communication with user equipment device 300 may include two optical sensors 506. In other embodiments, each of user equipment device 300 and user detection component 500 may include an optical sensor, and processor 502 receives image data from the optical sensor of user equipment device 300 and the optical sensor of user detection component 500. Processor 502 may receive data identifying the location of optical sensor 506 relative to display 312 and/or relative to each other and use this information when determining the gaze point.

In other embodiments accounting for a user's head movement, user detection component 500 includes two or more light sources for generating multiple glints. For example, two light sources 504 may create glints at different locations of an eye; having information on the two glints allows the processor to determine a 3D position of the user's eye or eyes, allowing processor 502 to compensate for head movement. Processor 502 may also receive data identifying the location of light sources 504 relative to display 312 and/or relative to each other and use this information when determining the gaze point.

In some embodiments, other types of eye contact detection components that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of user detection component 500.

In some embodiments, user detection component 500 may also be used to identify a user. For example, user detection component 500 may include one or more content capture device (e.g., a camera). The content capture device may obtain an image of a current user. The media guidance application (e.g., via control circuitry 304 (FIG. 3)) may then compare the obtained image with a database of user images and corresponding names. Upon detecting a match between the obtained image and an image in the database, the media guidance application may retrieve a name (e.g., identifying a user or a user profile) associated with the matched image.

It should be noted that user detection component 500 is but one type of component that may be incorporated into or accessible by detection module 316 (FIG. 3) or the media application. Other types of components, which may generate other types of data (e.g., video, audio, textual, etc.) are fully within the bounds of this disclosure.

Figure 6:
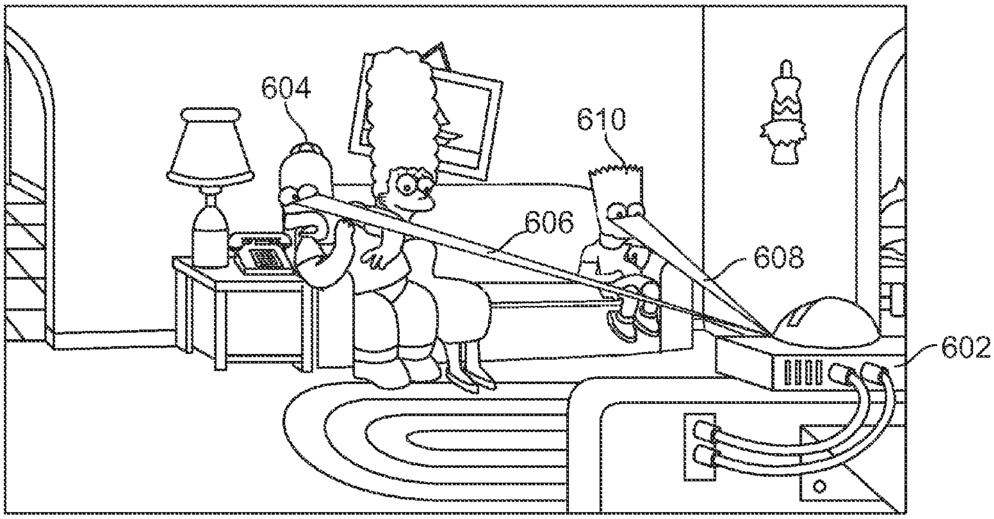
FIG. 6 is an illustrative location at which multiple users are viewing a media asset at different viewing directions in accordance with some embodiments of the disclosure.

FIG. 6 is an illustrative location at which multiple users are viewing a media asset at different viewing directions. As shown in FIG. 6, location 600 includes a user device 602 currently generating a holographic image being viewed by user 604 and user 610. As user 604 and user 610 are located at different positions relative to user device 602, user 604 and user 610 are associated with different viewing directions. User 604 is associated with viewing direction 606, and user 610 is associated with viewing direction 608.

As user 604 and user 610 are associated with different viewing direction, user 604 and user 610 may see different images. For example, a holographic media asset generated by user device 602 may include a plurality of frames all associate with a single instance of the holographic media asset. As each of the plurality of frames is associated with a different viewing angle, a difference in the frames associated with viewing direction 606 and viewing direction 608 may cause user 604 and user 608 to see a different image associated with the media asset.

In some embodiments, a media guidance application may determine (e.g., via user detection component 500 (FIG. 5)) a position of user 604 and user 610 relative to user device 602. Based on the position of user 604 and user 610, the media guidance application (e.g., via processing circuitry 306 (FIG. 3)) may determine a viewing direction for user 604 and user 610. For example, using information received (e.g., via user detection component 500 (FIG. 5)) indicating the position (e.g., in x, y, z coordinates) of a user (e.g., user 604 or user 610) and/or the gaze point of the user, the media guidance application (e.g., via processing circuitry 306 (FIG. 3)) may determine one or more angles between user device 602 and the user (e.g., user 604 or 610). The media guidance application may combined the one or more angles (e.g., a vector coordinate in the x direction and a vector coordinate in the y direction) to determine a viewing direction (e.g., viewing direction 606 or viewing direction 608) associated with the user (e.g., user 604 or user 610).

In some embodiments, the media guidance application may then compare the viewing direction (e.g., viewing direction 606 and viewing direction 608) to a database (e.g., located locally on storage 308 (FIG. 3) on user device 602 or remotely on media content source 416 (FIG. 4), media guidance data source 418 (FIG. 4), or any other location accessible via communications network 414 (FIG. 4)) indicating the coordinates of viewing directions associated with each frame of the plurality of frames of a media asset. For example, viewing direction 606 (e.g., associated with user 604) may, in some embodiments, be associated with a first frame of the plurality of frames and viewing direction 608 (e.g., associated with user 610) may be associated with a second frame of the plurality of frames.

After determining the frame of the plurality of frames associated with each viewing direction (e.g., viewing direction 606 and viewing direction 608), the media guidance application may modify the frame (e.g., by included supplemental content) according to user criteria. For example, the media guidance application may receive (e.g., via I/O path 302 (FIG. 3)) user requests for particular content. In response, the media guidance application may modify a frame of the plurality of frames associated with a user to include the particular content.

For example, for the series of frames associated with viewing direction 606 (e.g., one frame of the plurality of frames corresponding to each instance of the media asset), the media guidance application (e.g., implemented on user device 602) may modify each frame or retrieve (e.g., from storage 308 (FIG. 3), media content source 416 (FIG. 4), media guidance data source 418 (FIG. 4), or any other location accessible via communications network 414 (FIG. 4)) a frame that includes the particular content requested by a user.

Additionally or alternatively, the media guidance application (e.g., via processing circuitry 306 (FIG. 3)) may determine particular content for presentation to a user. For example, the media guidance application may access a user profile (e.g., located locally on storage 308 (FIG. 3) on user device 602 or remotely on media content source 416 (FIG. 4), media guidance data source 418 (FIG. 4), or any other location accessible via communications network 414 (FIG. 4)) that indicates the particular characteristics (e.g., genre, actor, etc.) and/or media assets (e.g., titles, series, etc.) of interest to the user. Based on the information in the user profile, the media guidance application (e.g., via processing circuitry 306 (FIG. 3)) may select media assets from a database of available media assets (e.g., located on media content source 416 (FIG. 4)) that match and/or have characteristics that match the characteristics and/or media assets identified in the user profile.

Additionally or alternatively, the media guidance application (e.g., via processing circuitry 306 (FIG. 3)) may receive recommendations of particular content for presentation to a user. For example, the media guidance application may access social networks associated with the user and based on information (e.g., posts, status updates, microblog entries, etc.) received from the social networks, the media guidance application may recommend particular content. The media guidance application may also receive (e.g., from media content source 416 (FIG. 4), media guidance data source 418 (FIG. 4), or any other location accessible via communications network 414 (FIG. 4)) recommendations of particular content via other third party sources indicating ratings, current events, and/or any other information that may interest a user.

After selecting the particular content, the media guidance application (e.g., via control circuitry 304 (FIG. 3)) may modify a frame of the plurality of frames associated with a user (e.g., based on a viewing direction associated with a user) to include the particular content, or may retrieve a substitute frame (e.g., from media content source 416 (FIG. 4), media guidance data source 418 (FIG. 4), or any other location accessible via communications network 414 (FIG. 4)) as described in process 800 (FIG. 8) below. The media guidance application may include the modified/substituted frame in the plurality of frames of the media asset. As a result, a user (e.g., user 604 or user 610) associated with a viewing direction (e.g., viewing direction 606 or viewing direction 608) corresponding to the modified/substituted frame may view the particular content as supplemental content while viewing the media asset. Moreover, as user 604 is associated with a different viewing direction than user 610, user 604 may simultaneously view different supplemental content than supplemental content view by user 610.

Figure 7:
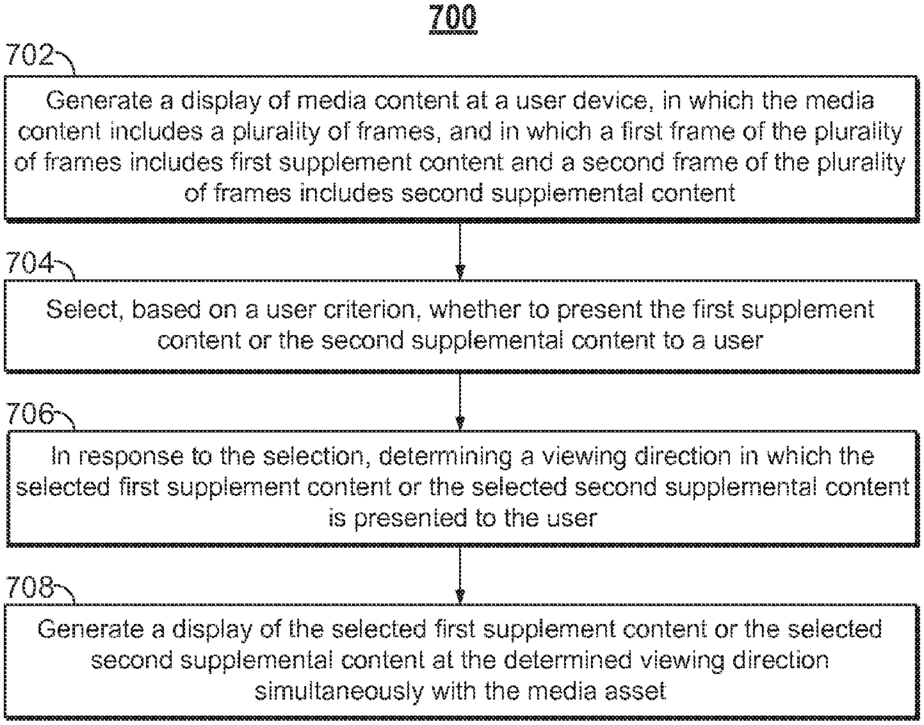
FIG. 7 is a flow-chart of illustrative steps involved in generating holographic supplemental content simultaneously with a media asset in accordance with some embodiments of the disclosure.

FIG. 7 shows illustrative steps for generating a display of supplemental content at a determined viewing direction simultaneously with the media asset. It should be noted that process 700 or any step thereof, could be performed on a media guidance application implement on any of the devices shown in FIGS. 3-4. For example, process 700 may be executed by control circuitry 304 (FIG. 3) as instructed by the media guidance application. In addition, one or more steps of process 700 may be incorporated into or combined with one or more steps of any other processes (e.g., process 800 (FIG. 8), process 1000 (FIG. 10), process 1100 (FIG. 11), etc. as described herein.

At step 702, the media guidance application generates a display of media content at a user device, in which the media content includes a plurality of frames, and in which a first frame of the plurality of frames includes first supplemental content and a second frame of the plurality of frames includes second supplemental content. For example, in order to generate holographic media content a media guidance application implemented on a user device (e.g., user equipment device 402, 404, and/or 406 (FIG. 4)) and/or implemented upon user device 602 (FIG. 6) may present (e.g., via control circuitry 304 (FIG. 3)) a single instance of media content as a combination of multiple frames, in which each of the multiple frames corresponds to the same instance of the media content, but from slightly different viewing directions.

The media guidance application may also receive (e.g., via I/O path 302 (FIG. 3)) multiple frames corresponding to the same viewing direction at the same instance, in which the multiple frames contain different types of supplemental content. For example, one frame may include French subtitles and a different frame may include Spanish subtitles. Additionally or alternatively, one frame may include advertisements for one type of products and a different frame may include links to additional information about objects in the media content.

At step 704, the media guidance application selects, based on a user criterion, whether to present the first supplemental content or the second supplemental content to a user. In some embodiments, a user criterion may relate to a user input (e.g., received via user input interface 310 (FIG. 3)). For example, a user may select to receive the media content with Spanish subtitles. In such a case, the media guidance application (e.g., via processing circuitry 306 (FIG. 3)) would select a frame featuring Spanish subtitles as the supplemental content.

Alternatively or additionally, the user criterion may correspond to a requirement other than a user input. For example a user criterion may relate to a parent control option for blocking out objectionable content. In such a case, one frame may include an overlay preventing the display of objectionable content while a different frame does not include the overlay. Based on the parent control (e.g., preventing a display of objectionable content), the frame with the overlay may be selected.

Alternatively or additionally, the user criterion may correspond to requirement for disabling supplemental content. In such a case, one frame may include a supplemental content while a different frame does not include the supplemental content. In response to the user criterion to prevent supplemental content, the media guidance application may select the frame without the supplemental content.

The media guidance application may also cross-reference a user profile to determine a user criterion. For example, the media guidance application may retrieve information (e.g., from storage 308 (FIG. 3)) associated with the preferences of the user. Based on the preferences (e.g., indicating the type of supplemental content enjoyed by the user), the media guidance application (e.g., via processing circuitry 306 (FIG. 3)) may present a frame featuring supplemental content that corresponds to the user preferences.

At step 706, in response to the selection, the media guidance application determines a viewing direction in which the selected first supplemental content or the selected second supplemental content is presented to the user. For example, the media guidance application may retrieve information (e.g., using user detection component 500 (FIG. 5)) indicating the current location of the user. The media guidance application may then select a viewing direction (e.g., from a plurality of viewing directions associated with the display of the media content) that corresponds to the location of the user (e.g., as described in relation to FIG. 6 above).

At step 708, the media guidance application generates a display of the selected first supplemental content or the selected second supplemental content at the determined viewing direction simultaneously with the media asset. For example, the media guidance application may generate a presentation of the selected supplemental content simultaneously with the media content to multiple users (e.g., users 604 and 610 (FIG. 6)). The media guidance application may use a user device (e.g., user device 602 (FIG. 6)), which is configured to present holographic media asset.

It should be noted that any of the devices or equipment discussed in relation to FIGS. 3-4 could be used to perform one of more of the steps in FIG. 7. It is also contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
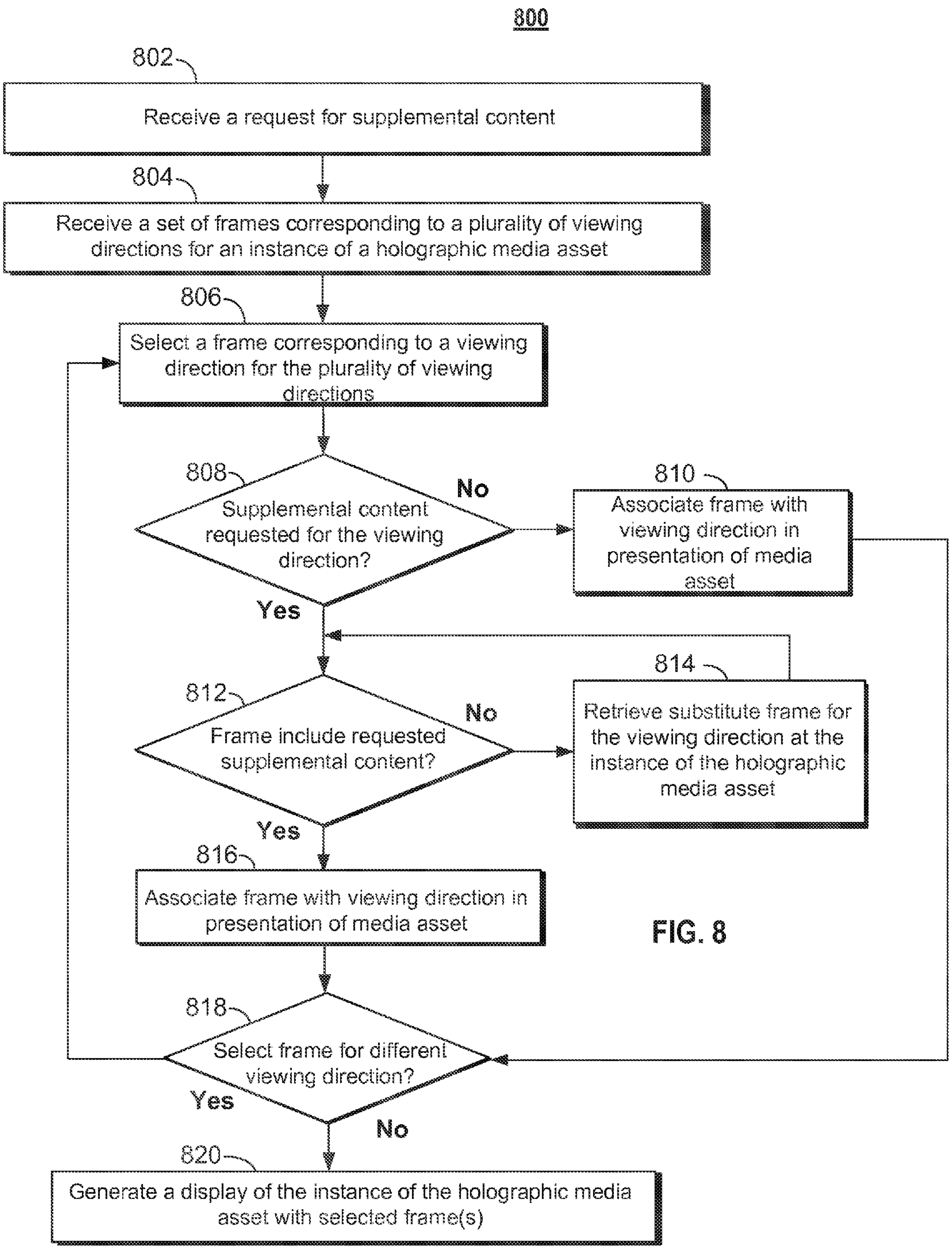
FIG. 8 is a flow-chart of illustrative steps involved in selecting frames for generating holographic supplemental content simultaneously with a media asset in accordance with some embodiments of the disclosure.

FIG. 8 is a flow-chart of illustrative steps involved in selecting frames for generating holographic supplemental content simultaneously with a media asset. It should be noted that process 800 or any step thereof, could be performed on a media guidance application implement on any of the devices shown in FIGS. 3-4. For example, process 800 may be executed by control circuitry 304 (FIG. 3) as instructed by the media guidance application. In addition, one or more steps of process 800 may be incorporated into or combined with one or more steps of any other processes (e.g., process 700 (FIG. 7), process 1000 (FIG. 10), process 1100 (FIG. 11), etc. as described herein.

At step 802, the media guidance application receives a request for the display of a holographic media asset to be displayed simultaneously with supplemental content from a user. For example, the media guidance application may determine (e.g., via processing circuitry 306 (FIG. 3)), in response to a user input (e.g., via user input interface 310 (FIG. 3)) received at a display device (e.g., a display associated with, or incorporated into, user equipment device 402, 404, and/or 406 (FIG. 4)) or at user device 602 (FIG. 6) or based on a user profile (e.g., retrieved from storage 308 (FIG. 3)) associated with a user (e.g., identified using user detection component 500 (FIG. 5)) that the user would like supplemental content displayed simultaneously with the media asset. For example, the holographic media asset may include a plurality of frames for each instance of the media asset. Based on the preferences (e.g., as determined by a user input or a user profile) associated with each user at a particular viewing direction, the media guidance application may modify and/or substitute the default frame of a media asset with a frame including supplemental content corresponding to the user.

At step 804, the media guidance application receives a set of frames corresponding to a plurality of viewing directions for an instance of a holographic media asset. In some embodiments, step 804 may correspond with step 702 (FIG. 7). For example, a media guidance application implemented on a user device (e.g., user equipment device 402, 404, and/or 406 (FIG. 4)) and/or implemented upon user device 602 (FIG. 6) receives (e.g., via I/O path 302 (FIG. 3) a series of frames that makes up an instance of a media asset. For example, as described above in order to generate a holographic media asset, the media guidance application instructs (e.g., via control circuitry 304 (FIG. 3)) a user device (e.g., user device 602 (FIG. 6)) to generate a plurality of frames each corresponding to a particular viewing direction. A user (e.g., user 604 (FIG. 6)) viewing the media asset from a particular viewing direction (e.g., viewing direction 606 (FIG. 6)) then views the frame associated with the particular viewing direction.

At step 806, the media guidance application selects a frame corresponding to a viewing direction for the plurality of viewing directions. For example, the media guidance application may process (e.g., using processing circuitry 306 (FIG. 3)) each frame of the plurality of frames corresponding to an instance of the media asset. In some embodiments, each frame may be process simultaneously or each frame may be processed in successive iterations.

At step 808, the media guidance application determines whether or not supplemental content has been requested for the viewing direction. For example, the media guidance application determines (e.g., using processing circuitry 306 (FIG. 3)) whether or not the user that requested the supplemental content is associated with the viewing direction of the frame. For example, the media guidance application may determine (e.g., via user detection component 500 (FIG. 5)) the location of the user. Based on the location, the media guidance application determines (e.g., via processing circuitry 306 (FIG. 3)) a viewing direction of the user (e.g., as described in relation to FIG. 6 above). If supplemental content has not been requested at the viewing direction, the media guidance application proceeds to step 810 and associates the frame with the viewing direction in the presentation of the media asset before proceeding to step 818.

At step 812, the media guidance application determines whether or not the frame corresponds to the requested supplemental content. The media guidance application may determine that the received frame has supplemental content based on analyzing (e.g., using processing circuitry 306 (FIG. 3)) data (e.g., media guidance data received with the media asset) indicating that the current frame includes supplemental content (and/or the type of supplemental content). The media guidance application may also use various types of object recognition (as described above) to determines whether or not the current frame includes supplemental content. Additionally or alternatively, the media guidance application may determine that the received frame has a particular type of supplemental content based on analyzing (e.g., using processing circuitry 306 (FIG. 3)) data (e.g., media guidance data received with the media asset) indicating that the current frame includes supplemental content of a particular type or using the object recognition technology described above. For example, the media guidance application may receive multiple frames (e.g., each corresponding to the same instance in a media asset) including various types of supplemental content (e.g., subtitles in various languages, advertisements for various products, etc.). The media guidance application may then determines (e.g., via processing circuitry 306 (FIG. 3)) whether or not the particular supplemental content corresponds to the current user (e.g., matches the type of supplemental content requested via user input interface 310 (FIG. 3)) or is associated with the user based on a comparison with a user profile.

If the media guidance application determines that the frame does not correspond to the requested supplemental content, the media guidance application retrieves a substitute frame for the viewing direction at the instance of the media asset at step 814. For example, the media guidance application may cross-reference a database (e.g., located a media content source 416 (FIG. 4), media guidance data source 418, and/or any location accessible by communications network 414 (FIG. 4)) associated with substitute frames and/or media assets that include particular types of supplemental content. In response to determining that the frame does not include the requested supplemental information at the viewing direction of the user, the media guidance application may query the database for a frame that does include the requested supplemental information and return to step 812. It should be noted that in some embodiments, the media guidance application may instead of querying a database for a particular frame that corresponds to the supplemental content and the viewing direction of the user, may query the database for an entire media asset (including a series of frames making up each viewing direction) that includes the supplemental content at the viewing direction of the user. If the media guidance application determines (e.g. via processing circuitry 306 (FIG. 3)) that the supplemental content is included in the frame, the media guidance application (e.g., via control circuitry 304 (FIG. 3)) associates the frame with the viewing direction of the user in the media asset at step 816.

At step 818, the media guidance application determines whether or not to select a frame for a different viewing direction. For example, the media guidance application may determine (e.g., via user detection component 500 (FIG. 5)) whether or not there are additional user viewing the holographic media asset. if so, the media guidance application returns to step 804 to process a frame associated with the viewing direction of that user. If the media guidance application determines (e.g., via user detection component 500 (FIG. 5)) that there are no additional users viewing the holographic media asset, the media guidance application proceeds to step 818.

At step 820, the media guidance application generates a display of the holographic media assets with the associated frame(s). For example, the media guidance application may generate (e.g., using control circuitry 304 (FIG. 3)) for display (e.g., on display 312 (FIG. 3)) a holographic media asset shown to a plurality of users (e.g., as described in relation to FIG. 6). It should be noted that in some embodiments, the media guidance application may perform process 800 for each frames of the plurality of frames for each instance of the media asset before the media asset is presented to a user. For example, the media guidance application may perform (e.g., using control circuitry 304 (FIG. 3)) multiple iterations (e.g., either successively or simultaneously) to generate a holographic media asset for presentation to one or more users. The holographic media asset may then be stored (e.g., locally on storage 308 (FIG. 3) or remotely on a database located at media content source 416, media guidance data source 418, and/or any location accessible via communications network 414 (FIG. 4)) until the media asset is requested by a user.

Additionally or alternatively, the media guidance may perform process 800 in real-time. For example, the media guidance application may generate for display each instance of the media asset as it is process (e.g., according to process 800). In some embodiments, the media guidance application may buffer (e.g., in storage 308 (FIG. 3)) a portion of the holographic media asset in order to prevent playback disruption.

It should also be noted, that in some embodiments, the media guidance application may retrieve (e.g., from media content source 416 (FIG. 4) or any location accessible via communications network 414 (FIG. 4)) an entire media asset (as opposed to a single frame) including the supplemental content at the viewing direction of the user. For example, in some embodiments, the media guidance application may receive individual frames (e.g., corresponding to the particular instance of supplemental content needed by the user) or may receive a series of frames (e.g., corresponding to a segment or the entire presentation of a media asset). Instead of retrieving a single frame and substituting the frame into the media asset, the media guidance application may retrieve an entire media asset with the supplemental content at the viewing direction already included.

It should be noted that any of the devices or equipment discussed in relation to FIGS. 3-4 could be used to perform one of more of the steps in FIG. 8. It is also contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

FIGS. 9A-D show illustrative examples of an optical user device used to view media content that when viewed by a user is perceived by the user to have a 3D effect. In some embodiments, optical user device 900 may be any stereoscopic device. Furthermore, it should be noted that although FIGS. 9A-D are described in relation to active shutter stereoscopic systems the embodiments described herein could also be applied to other stereoscopic techniques. For example, in some embodiments, instead of shutters (e.g., shutter 902 and shutter 904) a passive stereoscopic system (e.g., based on the polarization of the lens of optical user device 900) may be employed. In such an embodiment, a media guidance application may synchronize the display of the media content with the polarization of the optical user device, instead of opening and closing the shutters on the optical user device.

In FIGS. 9A-D, optical user device 900 is implemented as headwear (e.g., glasses) worn by a user. It should be noted that in some embodiments, optical user device 900 may be configured as any type of stereoscopic optical device. For example, in some embodiments, optical user device 900 may be a LCD shutter glasses, circular polarized glasses, anaglyph glasses, chroma depth glasses. Moreover, in stereoscopic optical devices that do not use active shutters systems (e.g., anaglyph glasses), the optical user device may be re-purposed to include the active shutter system or may be re-purposed to be polarized to selectively view frame rates as described herein.

In FIGS. 9A-D, optical user device 900 includes shutter 902 and shutter 904. Shutter 902 and shutter 904 may operate in either an open position or a closed position. Based on the position of a shutter (e.g., shutter 902 or shutter 904), a user using optical user device 900 may or may not view a media asset with an eye (e.g., a right eye or a left eye) associated with the shutter. In some embodiments, the rapid opening and closing of the shutters associated with different eyes of a user may create a parallax effect, which causes a user to perceive a specially formatted media asset viewed through optical device 900 as appearing in three dimensions.

FIGS. 9A-D also includes display 906. In some embodiments, display 906 represents a display on a device (e.g., user equipment device 402, 404, and/or 406 (FIG. 4)), which includes frames of a multiplexed media asset (e.g., as described below in FIG. 12). The synchronization of the opening and closing of shutters 902 and 904 creates both the 3D effect as well as the selective display of supplemental content to the first user. For example, in FIGS. 9A-D, display 906 is alternating between a frame associated with supplemental content for the first user and a frame with different supplemental content for a second user.

FIGS. 9A-D represent a repeating pattern in which a synchronization scheme of a user device (e.g., optical user device 900) prevents a user from viewing the supplemental content for another viewer. As shown in FIGS. 9A-D, the opening and closing of the shutters of optical user device 900 forms a pattern. This pattern, or synchronization scheme, is synchronized with the display of frames of a media asset associated with each eye of a user. In addition, this pattern is synchronized with a refresh or frame-rate of a user equipment device (e.g., user equipment device 402, 404, and/or 406 (FIG. 4)) that may generate display 906. For example, the changing frames of display 906 in FIGS. 9A-D may correspond to a frame-rate of a multiplexed media asset viewed by a user with optical user device 900.

The media guidance application (e.g., via instructions issued from control circuitry 304 (FIG. 3)) may ensure that optical user device 900 and the user equipment device associated with display 906 share the same synchronization scheme. For example, the media guidance application ensures that an open operation performed by the optical user device occurs on, and lasts the duration of, a single refresh (e.g., the display of a single frame) on the user equipment device. Likewise, a close operation performed by the optical user device occurs on, and lasts the duration of, a single refresh (e.g., the display of a single frame). Thus, in a series of four frames (e.g., corresponding to FIGS. 9A-D), the user views a first frame in FIG. 9A (i.e., when the optical user device is performing an open operation), is prevented from viewing the second frame in FIG. 9B (i.e., when the optical user device is performing a close operation), views the third frame in FIG. 9C (i.e., when the optical user device performing an open operation), and is prevented from viewing the fourth frame in FIG. 9D (i.e., when the optical user device is performing a close operation).

The media guidance application also ensures that optical user device 900 and the user equipment device associated with display 906 are in the correct phase. For example, the media guidance application (e.g., via instructions issued from control circuitry 304 (FIG. 3)) ensures that one of the shutters (e.g., shutter 902 or shutter 904) associated with optical user device 900 worn by a first user is open when display 906 is present content for the first user, and is closed with display 906 presents content for the second user.

Figure 9A:
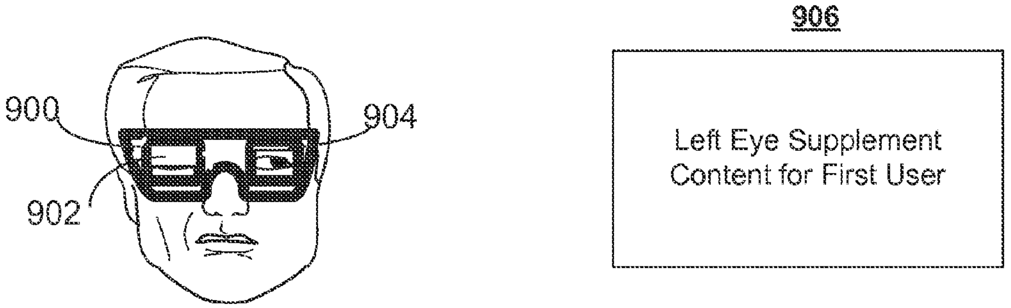
FIG. 9A is an illustrative embodiment of an optical user deceive used for viewing media content in accordance with some embodiments of the disclosure.

For example, in FIG. 9A, display 906 is currently showing supplemental content associated with a left eye of a first user. Due to the synchronization scheme determined by the media guidance application (e.g., via processing circuitry 306 (FIG. 3)), shutter 902 is currently in a closed position. While in a closed position, the first user wearing optical user device 900 cannot view displayed media content from his/her right eye, which is associated with shutter 902. Alternatively, shutter 904 is open. Consequently, the first user can view content with his/her left eye, which is associated with shutter 904.

Figure 9B:
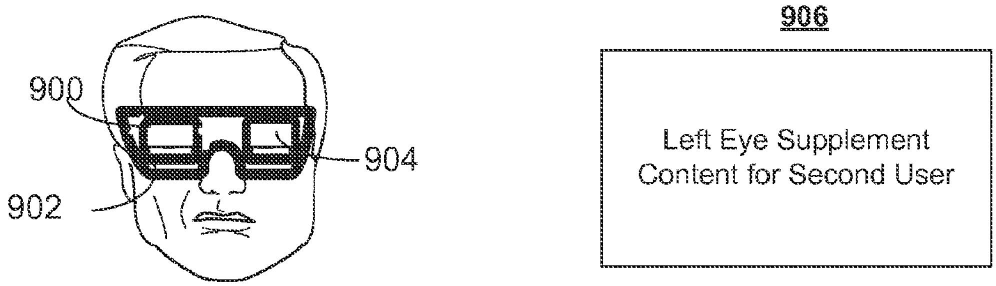
FIG. 9B is another illustrative embodiment of an optical user deceive used for viewing media content in accordance with some embodiments of the disclosure.
Figure 9C:
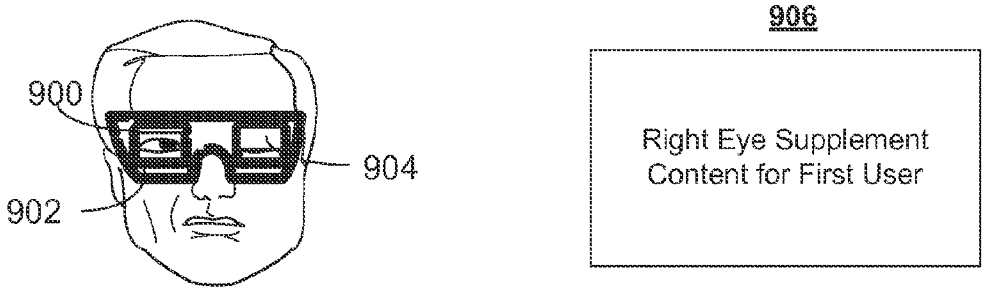
FIG. 9C is another illustrative embodiment of an optical user deceive used for viewing media content in accordance with some embodiments of the disclosure.

In FIG. 9B, display 906 is currently showing supplemental content associated with a left eye of a second user. Due to the synchronization scheme determined by the media guidance application (e.g., via processing circuitry 306 (FIG. 3)), both shutter 902 and shutter 904 of optical user device 900 worn by the first user are currently closed preventing the first user from seeing any of the supplemental content for the second user.

in FIG. 9C, display 906 is currently showing supplemental content associated with a right eye of the first user. Due to the synchronization scheme determined by the media guidance application (e.g., via processing circuitry 306 (FIG. 3)), shutter 904 is currently in a closed position. While in a closed position, the first user wearing optical user device 900 cannot view displayed media content from a his/her left eye, which is associated with shutter 904. Alternatively, shutter 902 is open. Consequently, the first user can view content with his/her right eye, which is associated with shutter 902.

Figure 9D:
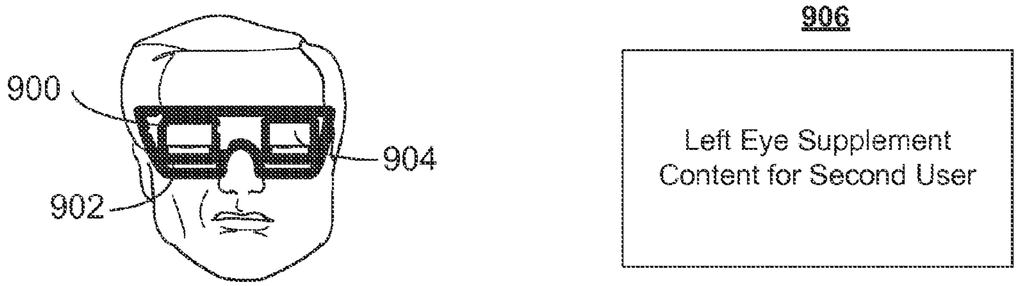
FIG. 9D is another illustrative embodiment of an optical user deceive used for viewing media content in accordance with some embodiments of the disclosure.

Finally, in FIG. 9D, display 906 is currently showing supplemental content associated with a right eye of the second user. Due to the synchronization scheme determined by the media guidance application (e.g., via processing circuitry 306 (FIG. 3)), both shutter 902 and 904 are once again closed preventing the first user from seeing any of the supplemental content for the second user.

In some embodiments, the pattern of opening and closing of shutters shown in FIGS. 9A-D may continue until the end of the media asset. As the media asset continues, the media guidance application maintains the synchronization of optical user device 900 and the display of frames of a media asset in display 906. If the media guidance application detects a disruption (e.g., a pause in the media asset), the media guidance application (e.g., via instructions issued from control circuitry 304 (FIG. 3)) ensures that optical user device 900 and the user equipment device associated with display 906 resynchronize.

Figure 10:
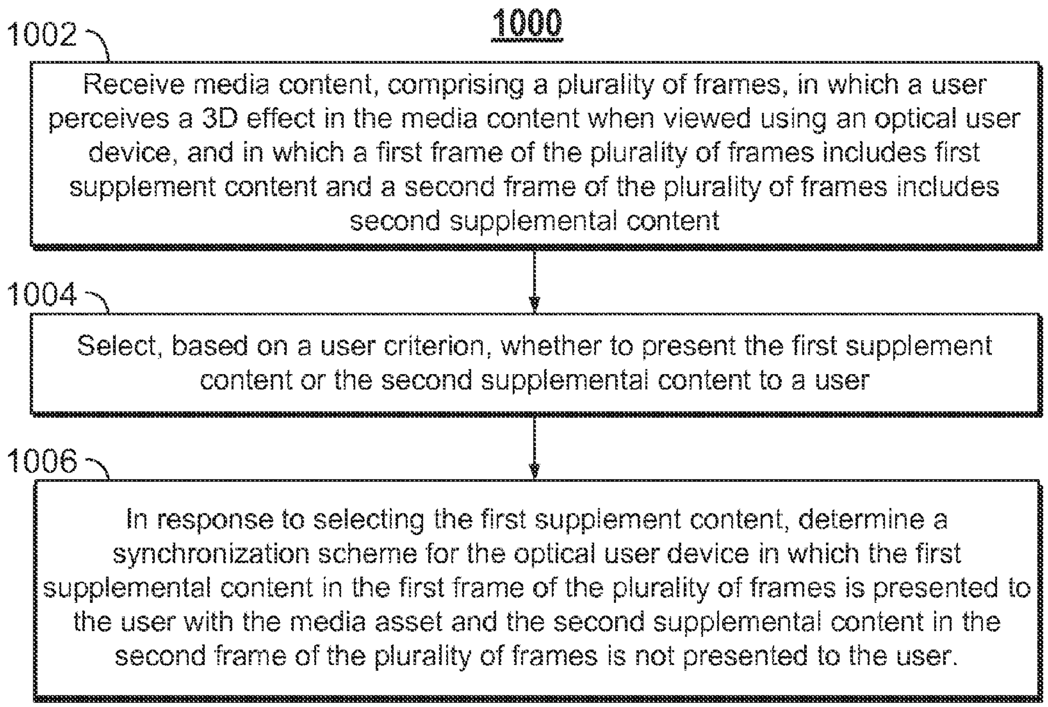
FIG. 10 is a flow-chart of illustrative steps involved in selecting supplemental content in accordance with some embodiments of the disclosure.

FIG. 10 is a flow-chart of illustrative steps involved in is a flow-chart of illustrative steps involved in selecting supplemental content. It should be noted that process 1000 or any step thereof, could be performed on a media guidance application implement on any of the devices shown in FIGS. 3-4. For example, process 1000 may be executed by control circuitry 304 (FIG. 3) as instructed by the media guidance application. In addition, one or more steps of process 1000 may be incorporated into or combined with one or more steps of any other processes (e.g., process 700 (FIG. 7), process 800 (FIG. 8), process 1100 (FIG. 11), etc. as described herein.

At step 1002, the media guidance application receives receive media content, comprising a plurality of frames, in which a user perceives a 3D effect in the media content when viewed using an optical user device, and in which a first frame of the plurality of frames includes first supplemental content and a second frame of the plurality of frames includes second supplemental content. For example, the media guidance application may receive (e.g., via I/O path 302 (FIG. 3)) a plurality of frames associated with a media asset. The plurality of frames may correspond to the frames of the media asset associated with different eyes of a user as well as different supplemental content (e.g., as described in relation to FIGS. 9A-D). The media guidance application may receive the frames from local storage (e.g., storage 308 (FIG. 3)) or remote storage (e.g., media content source 416, media guidance data source 418, and/or any location accessible via communications network 414 (FIG. 4)).

At step 1004, the media guidance application selects, based on a user criterion, whether to present the first supplemental content or the second supplemental content to a user. In some embodiments, a user criterion may relate to a user input (e.g., received via user input interface 310 (FIG. 3)). For example, a user may select to receive the media content with Spanish subtitles. In such a case, the media guidance application (e.g., via processing circuitry 306 (FIG. 3)) may select a synchronization scheme such that frames featuring Spanish subtitles are displayed to a user. For example, the synchronization scheme may correspond to the "Supplemental Content for the User" as described in relation to FIG. 9. Specifically, the frame with the Spanish subtitles may be presented to the user (e.g., a frame associated with a right eye presentation is shown while the shutter for the right eye is open).

A user criterion may also correspond to a requirement other than a user input. For example a user criterion may relate to a parent control option for blocking out objectionable content. In such a case, one frame may include an overlay preventing the display of objectionable content while a different frame does not include the overlay. Based on the parent control (e.g., preventing a display of objectionable content), the frame with the overlay may be presented to the user (e.g., a frame associated with a right eye presentation is shown while the shutter for the right eye is open), while the frame without the overlay may be shown while the shutters for both eyes are closed.

The media guidance application may also cross-reference a user profile to determine a user criterion. For example, the media guidance application may retrieve information (e.g., from storage 308 (FIG. 3)) associated with the preferences of the user.

At step 1006, in response to selecting the first supplemental content, the media guidance application determines a synchronization scheme for the optical user device in which the first supplemental content in the first frame of the plurality of frames is presented to the user with the media asset and the second supplemental content in the second frame of the plurality of frames is not presented to the user.

For example, based on the preferences (e.g., indicating the type of supplemental content enjoyed by the user), the media guidance application (e.g., via processing circuitry 306 (FIG. 3)) may generate a synchronization scheme such that a series of frames featuring supplemental content that corresponds to the user preferences are displayed (e.g., are shown on a display device (e.g., user equipment device 402, 404, and/or 406 (FIG. 4)) when either shutter 902 (FIGS. 9A-D) or shutter 904 (FIGS. 9A-D) of optical user device 900 (FIGS. 9A-D) are open), while a series of frames that do not feature supplemental content or a series of frames that feature different supplemental content are not presented (e.g., are shown on a display device (e.g., user equipment device 402, 404, and/or 406 (FIG. 4)) when either shutter 902 (FIGS. 9A-D) or shutter 904 (FIGS. 9A-D) of optical user device 900 (FIGS. 9A-D) are open).

It should be noted that any of the devices or equipment discussed in relation to FIGS. 3-4 could be used to perform one of more of the steps in FIG. 10. It is also contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method.

Figure 11:
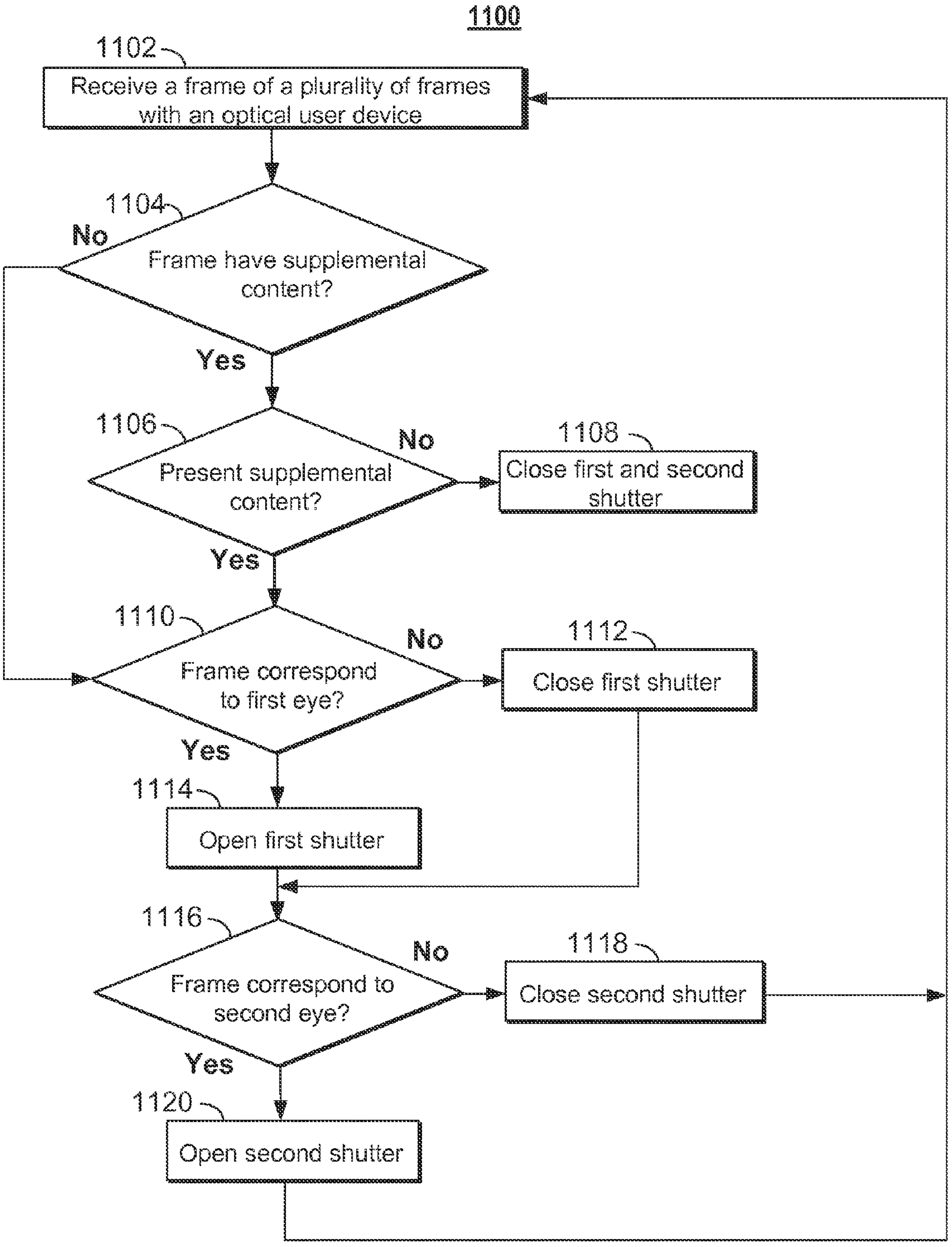
FIG. 11 is a flow-chart of illustrative steps involved in operating an optical user device according to a synchronization scheme in accordance with some embodiments of the disclosure.

FIG. 11 is a flow-chart of illustrative steps involved in is a flow-chart of illustrative steps involved in selecting supplemental content. It should be noted that process 1100 or any step thereof, could be performed on a media guidance application implement on any of the devices shown in FIGS. 3-4. For example, process 1100 may be executed by control circuitry 304 (FIG. 3) as instructed by the media guidance application. In addition, one or more steps of process 1100 may be incorporated into or combined with one or more steps of any other processes (e.g., process 700 (FIG. 7), process 800 (FIG. 8), process 1000 (FIG. 10), etc. as described herein.

At step 1102, the media guidance application receives a frame of a plurality of frames with an optical device. In some embodiments, step 1102 may correspond with step 1002 (FIG. 10). For example, a media guidance application implemented on a user device (e.g., user equipment device 402, 404, and/or 406 (FIG. 4)) or implemented upon an optical user device (e.g., optical user device 900 (FIGS. 9A-D)) receives (e.g., via I/O path 302 (FIG. 3) a series of frames that makes up an instance of a media asset.

At step 1104, the media guidance application determines whether or not the received frames has supplemental content. For example, the media guidance application may receive (e.g., via I/O path 302 (FIG. 3)) and process (e.g., via processing circuitry 306 (FIG. 3)) multiple types of frames. For example, the media guidance application may process frames associated with a particular eye as well as frames associated with supplemental content for each eye. For example, in order to generate a media asset (e.g., which ma be display on user equipment device 402, 404, and/or 406 (FIG. 4)) that is perceived by a user have a 3D effect, the media guidance application may generate a synchronization scheme for a optical user device (e.g., optical user device 900 (FIGS. 9A-D)). As described in relation to FIGS. 9A-D, the synchronization scheme creates the 3D effect by opening and closing shutters (e.g., shutter 902 and 904 (FIGS. 9A-D)) based on whether or not a particular frames (e.g., of the plurality of frames making up a media asset) is associated with either the left or right eye of a user. In addition to being associated by the media guidance application (and processed using processing circuitry 306 (FIG. 3) accordingly) with either a right or a left eye, the frame may also be associated with supplemental content.

For example, the media guidance application may generate the effect of a subtitle (e.g., received from media guidance data source 418 (FIG. 4) and/or any location accessible via communications network 414 (FIG. 4)) in a language choice of a user (e.g., as received via a user input interface 310 (FIG. 3) and/or received from a user profile stored locally on storage 308 (FIG. 3)) being overlaid on the media asset by combining a frame of the media asset and a frame including only the supplemental content (i.e., transparent with the exception of the graphics/text of the subtitles). Additionally or alternatively, the media guidance application may receive (e.g., via I/O path 302 (FIG. 3)) a frame with the supplemental content already included.

For example, in response to a user input (e.g., via user input interface 310 (FIG. 3)) received at the display device (e.g., a display associated with, or incorporated into, user equipment device 402, 404, and/or 406 (FIG. 4)) or at the optical user device (e.g., optical user device 900 (FIGS. 9A-D)), requesting supplemental content, the media guidance application may retrieve (e.g., from media content source 416 (FIG. 4) or any location accessible via communications network 414 (FIG. 4)) a media asset including the supplemental content. In some embodiments, the media guidance application may receive individual frames (e.g., corresponding to the particular instance of supplemental content needed by the user) or may receive a series of frames (e.g., corresponding to a segment or the entire presentation of a media asset).

The media guidance application may determine that the received frame has supplemental content based on analyzing (e.g., using processing circuitry 306 (FIG. 3)) data (e.g., media guidance data received with the media asset) indicating that the current frame includes supplemental content (and/or the type of supplemental content). The media guidance application may also use various types of object recognition (as described above) to determines whether or not the current frame includes supplemental content. If the media guidance application determines (e.g., via processing circuitry 306 (FIG. 3)) that the frame does not include supplemental content, the media guidance application proceeds to step 1110. If the media guidance application determines (e.g., via processing circuitry 306 (FIG. 3)) that the frame does include supplemental content, the media guidance application proceeds to step 1106.

At step 1106, the media guidance application determines whether or not to present the supplemental content. For example, the media guidance application may determine that the received frame has a particular type of supplemental content based on analyzing (e.g., using processing circuitry 306 (FIG. 3)) data (e.g., media guidance data received with the media asset) indicating that the current frame includes supplemental content of a particular type or using the object recognition technology described above. For example, the media guidance application may receive multiple frames (e.g., each corresponding to the same instance in a media asset) including various types of supplemental content (e.g., subtitles in various languages, advertisements for various products, etc.). The media guidance application may then determines (e.g., via processing circuitry 306 (FIG. 3)) whether or not the particular supplemental content corresponds to the current user (e.g., matching the type of supplemental content requested via user input interface 310 (FIG. 3)) or associated with the user based on a comparison with a user profile. If the media guidance application determines (e.g. via processing circuitry 306 (FIG. 3)) that the supplemental content should not be presented to a user (e.g., the user does not wish to view any supplemental content or just not supplemental content of this type), the media guidance application instructs (e.g., via control circuitry 304 (FIG. 3)) to close both the first and second shutters of the optical user device (e.g., optical user device 900 (FIGS. 9A-D)) at step 1108 (e.g., in order to prevent the user from viewing the frame with eye his/her right or left eye) and returns to step 1102.

If the media guidance application determines (e.g. via processing circuitry 306 (FIG. 3)) that the supplemental content should be presented to a user (e.g., the user wishes to view supplemental content of this type), the media guidance application proceeds to step 1110 and determines if the frame corresponds to a first eye. At step 1110, the media guidance application determines whether or not the frame corresponds to a first eye. If the media guidance application determines (e.g., via processing circuitry 306 (FIG. 3)) that the frame corresponds to the first eye, the media guidance application instructs (e.g., via control circuitry 304 (FIG. 4)) the optical user device (e.g., optical user device 900 (FIGS. 9A-D)) to open the shutter (e.g., shutter 902 or 904 (FIGS. 9A-D)) associated with the first eye at step 1114. If the media guidance application determines (e.g., via processing circuitry 306 (FIG. 3)) that the frame does not correspond to the first eye, the media guidance application instructs (e.g., via control circuitry 304 (FIG. 4)) the optical user device (e.g., optical user device 900 (FIGS. 9A-D)) to close the shutter (e.g., shutter 902 or 904 (FIGS. 9A-D)) associated with the first eye at step 1112. After determining (e.g., via processing circuitry 306 (FIG. 3)) whether or not the frame corresponds to the first eye (and/or whether or not to instruct (e.g., via control circuitry 304 (FIG. 3)) to open and/or close a shutter (e.g., shutter 902 or 904 (FIGS. 9A-D)) on a user optical device (e.g., user optical device 900 (FIGS. 9A-D)), the media guidance application proceeds to step 1116.

At step 1116, the media guidance application determines whether or not the frame corresponds to a second eye. If the media guidance application determines (e.g., via processing circuitry 306 (FIG. 3)) that the frame corresponds to the second eye, the media guidance application instructs (e.g., via control circuitry 304 (FIG. 4)) the optical user device (e.g., optical user device 900 (FIGS. 9A-D)) to open the shutter (e.g., shutter 902 or 904 (FIGS. 9A-D)) associated with the second eye at step 1120. If the media guidance application determines (e.g., via processing circuitry 306 (FIG. 3)) that the frame does not correspond to the second eye, the media guidance application instructs (e.g., via control circuitry 304 (FIG. 4)) the optical user device (e.g., optical user device 900 (FIGS. 9A-D)) to close the shutter (e.g., shutter 902 or 904 (FIGS. 9A-D)) associated with the second eye at step 1118. After determining (e.g., via processing circuitry 306 (FIG. 3)) whether or not the frame corresponds to the second eye (and/or whether or not to instruct (e.g., via control circuitry 304 (FIG. 3)) a user optical device (e.g., user optical device 900 (FIGS. 9A-D)) to open and/or close a shutter (e.g., shutter 902 or 904 (FIGS. 9A-D)), the media guidance application returns to step 1102 to receive a new frame to process. It should be noted that in some embodiments, the determining step described in relation to process 1100 may be performed according to a synchronization scheme as discussed in FIGS. 9A-D and FIG. 10.

Figure 12:
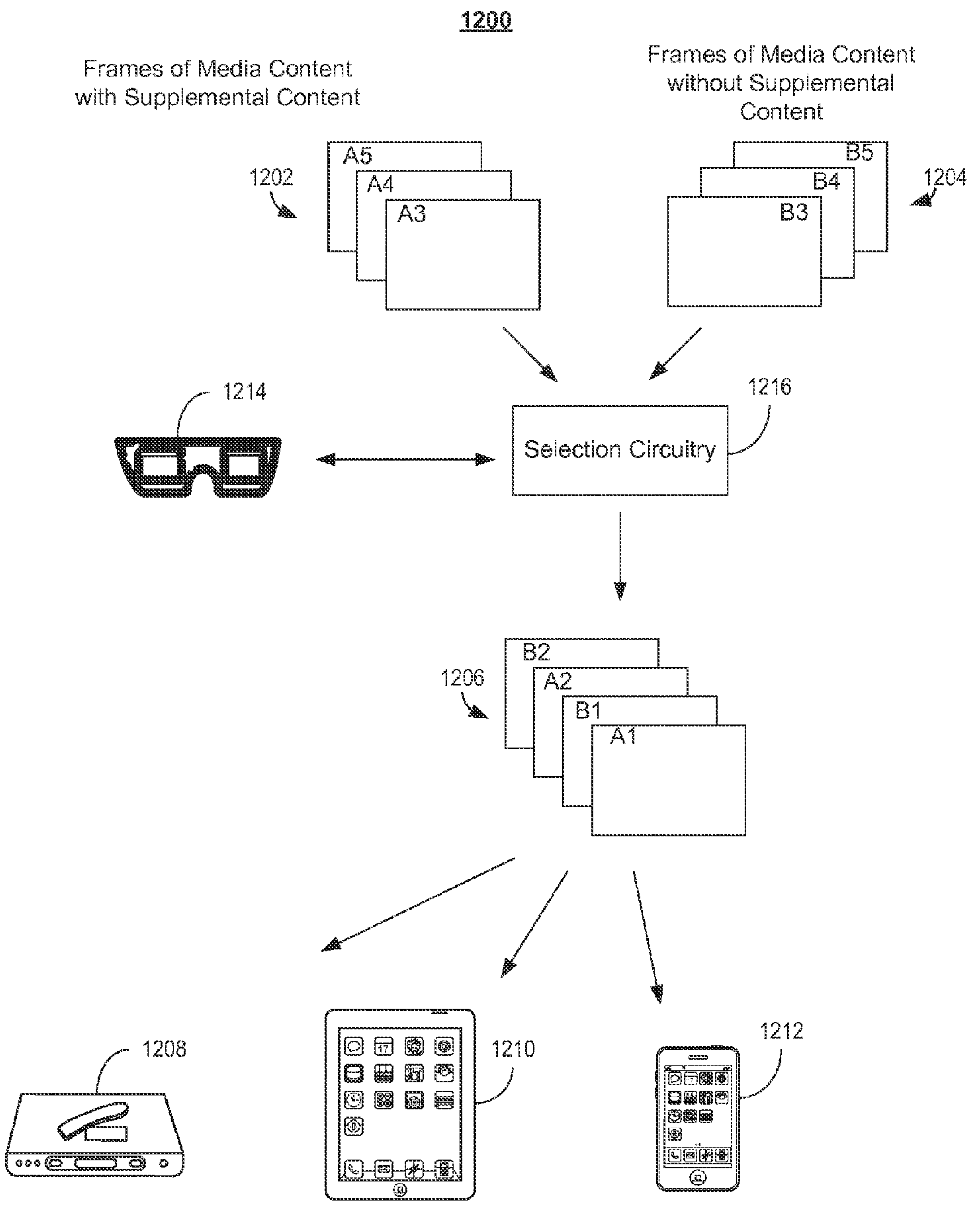
FIG. 12 is an illustrative example of a multiplexing system used by a media guidance application to generate media content in accordance with some embodiments of the disclosure.

FIG. 12 is an illustrative example of multiplexing system used by a media guidance application to generate media content for use in selectively displaying supplement content. FIG. 12 shows multiplexing system 1200, which may be used by a media guidance application implemented on a user device (e.g., user equipment device 1208, 1210, and/or 1212, optical user device 1214, or any other device accessible via communications network 414 (FIG. 4)) to generate multiplexed media asset 1206.

Multiplexing system 1200 may be used by the media guidance application to generate a multiplexed media asset that is associated with a synchronization scheme. As shown in FIG. 12, selection circuitry 1216, which in some embodiments may correspond to selection circuitry 318 (FIG. 3), may receive instructions from control circuitry 304 (FIG. 3)) for multiplexing media asset 1202 and media asset 1204. For example, the media guidance application (e.g., implemented on optical user device 1214, user equipment device 1208, 1210, and/or 1212) may incorporate and/or have access to selection circuitry 1216.

Selection circuitry 1216 may generate multiplexed media asset 1206 by forming a media asset with alternating frames from asset 1202 and asset 1204. For example, multiplexed media asset 1206 features a frame associated with a first instance of asset 1202, followed by a frame associated with a first instance of asset 1204, followed by a frame associated with a second instance of asset 1202, followed by a frame associated with a second instance of asset 1204, etc.

In some embodiments, to generate multiplexed media asset 1206, the media guidance application instructs (e.g., via control circuitry 304 (FIG. 3)) selection circuitry 1216 to initiate the multiplexing of asset 1202 and asset 1204. The media guidance application may also initiate toggling circuitry (which may be incorporated into and/or accessible by selection circuitry 1216 and/or the multiplexer) to feed asset 1202 and asset 1204 into the multiplexer according to a clock signal. The clock signal may indicate a cycling rate (e.g., corresponding to a refresh rate of user equipment device 1208, 1210, and/or 1212 displaying multiplexed media asset 1206 as well as the refresh rate of optical user device 1214) at which one of the frames of either asset 1202 or 1204 is incorporated into multiplexed media asset 1206. It should be noted that in some embodiments media assets may be multiplexed into a single media asset at a rate higher than the clock signal (even though upon subsequent playback of the multiplexed media asset will be displayed at the rate of the clock signal).

The media guidance application (e.g., via selection circuitry 1216) also indicates which media asset should correspond to the inputs of a multiplexer. For example, selection circuitry 1216 may indicate that asset 1202 corresponds to a first frame port and asset 1204 corresponds to a second frame port. Furthermore, the toggling circuitry indicates the rate as to which the multiplexer should output a frame from either of the frame ports, and which frame port the multiplexer should output a frame from. For example, as shown in FIG. 12, the multiplexed media asset 1206 alternates after each outputted frame from either frame port; thus, multiplexed media asset 1206 includes alternating frames from asset 1202 and 1204.

The media guidance application (e.g., via selection circuitry 1216) may also instruct the toggling circuitry to calibrate optical user device 1214 according to the clock signal. For example, in some embodiments, optical user device 1214 must be calibrated to the refresh rate of multiplexed media asset 1206.

The toggle circuitry may be a one-bit counter in some embodiments, and the output of the toggle circuitry may be coupled to a selection port of selection circuitry 1216. In some implementations, toggle circuitry receives a clock signal and changes the output at the end of each period of the clock signal. For example, the output of the toggle circuitry may at one period of the clock signal cause the output of selection circuitry 1216 to correspond to the first frame for a first user. The output of the toggle circuitry may at a next period of the clock signal cause the output of selection circuitry 1216 to correspond to the first frame for a second user. Accordingly, at each period of the clock, the output of selection circuitry 1216 and thereby the displayed frame changes to alternate between the frame for the first user and the frame for the second user. The output of toggle circuitry may also be output to the optical device. In response to receiving the output of the toggle circuitry, the optical device may either close one or both lens shutters or open one or both lens shutters depending on the synchronization scheme.

Specifically, when the toggle circuitry is causing selection circuitry 1216 to output the first frame for the first user, the first user's optical device may receive the output of the toggle circuitry and cause the lenses to be open. Alternatively, when the toggle circuitry is causing selection circuitry 1216 to output the first frame for the second user, the first user's optical device may receive the output of the toggle circuitry and cause the lenses to be closed while the second user's optical device may cause the lenses to be opened.

Although toggle circuitry is described in the context of selection circuitry 1216 receiving two different video signals, toggle circuitry may operate on selection circuitry 1216 that receives any number of different video signals (e.g., when three or more users are receiving different video signals). In such circumstances, the output of toggle circuitry may be a counter having a multi-bit output that increases or decreases at the end of each period of the clock. In some implementations, the number of bits output by toggle circuitry may be proportional to the number of different video signals received by selection circuitry 1216.

In some implementations, the number of different video signals that are input to selection circuitry 1216 may be proportional with the refresh rate. For example, with each additional video signal input to selection circuitry 1216 the refresh rate (and hence the clock signal) may be increased by 60 Hz.

The media guidance application may facilitate the transmission of signals (e.g., indicative of a synchronization scheme) between optical user device 1214 and selection circuitry 1216 (e.g., for use in calibrating optical user device 1214). Furthermore, the media guidance application may monitor and/or adjust (e.g., via control circuitry 304 (FIG. 3)) the synchronization of optical user device 1214 or user equipment device 1208, 1210, and/or 1212 if any device deviates from the synchronization scheme.

In some embodiments, optical user device 1214 and selection circuitry 1216 may communicate via communications network 414 (FIG. 4). As such, optical user device 1214 and selection circuitry 1216 may communicate via the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), short-range point-to-point communication paths, such as USB cables, IEEE 1394 cables, wireless paths (e.g., Bluetooth, infrared, IEEE 802-11x, etc.), or any other suitable wired or wireless communications path or combination of such paths.

For example, in some embodiments, a media guidance application may coordinate (e.g., via control circuitry 304 (FIG. 3)) a synchronization scheme for either the optical user device 1214 or a user equipment device 1205, 1208, and/or 1212. For example, the media guidance application may modify the synchronization scheme of optical user device 1214 (e.g., the rate at which shutters (e.g., shutter 902 and shutter 904 (FIG. 9)) on optical user device 1214 open and close) to match the current refresh rate of multiplexed media asset 1206 as displayed on user equipment 1208, 1210, and/or 1212.

To synchronize optical user device 1214 and the current refresh rate of multiplexed media asset 1206 as displayed on user equipment 1208, 1210, and/or 1212, the media guidance application may modify both the synchronization scheme of the optical user device and the user equipment device, or only the synchronization scheme of the user equipment device or optical user device. For example, in some embodiments, the media guidance application may modify the refresh rate associated with a media asset on a user device to match the synchronization scheme of an optical user device (e.g., optical user device 900 (FIG. 9)) or vice versa.

In addition, the media guidance application (e.g., via control circuitry 304 (FIG. 3)) may increase the refresh rate associated with the user equipment device (e.g., user equipment device 402, 404, and/or 406 (FIG. 4)) to match a refresh rate associated with optical user device 1214 that is necessary for selectively displaying supplemental content.

For example, if asset 1202 and asset 1204 both are initially associated with a refresh rate of 60 Hz, the media guidance application may need to double the refresh rate in order to ensure that an open operation performed by optical user device 1214 occurs on, and lasts the duration of, the display of a single frame of asset 1202 in multiplexed media asset 1206 (e.g., if the media guidance application determines the user should view the frame from asset 1202). Likewise, the media guidance application may need to double the refresh rate in order to ensure that a close operation performed by the optical user device occurs on, and lasts the duration of, a single frame of asset 1204 in multiplexed media asset 1206 (e.g., if the media guidance application determines the user should not view the frame from asset 1204).

For example, if the refresh rate is doubled (e.g. 120 Hz instead of 60 Hz) then a frame from both asset 1202 and 1204 may be displayed in multiplexed media asset 1206 in the same amount of time as a single frame in either asset 1202 or 1204. Furthermore, as the refresh rate of optical user device 1214 is also doubled (e.g., 120 Hz instead of 60 Hz), the user still only views one set of frames (e.g., frames from either asset 1202 or asset 1204). Moreover, as the number of frames of multiplexed media asset 1206 is doubled (compared to asset 1202 or 1204), but the rate at which the media guidance application presents multiplexed media asset 1206 is also doubled (compared to asset 1202 or 1204), the user views multiplexed media asset 1206 in the same amount of time as either asset 1202 or asset 1204 (albeit with twice as many open and close operations being performed by optical user device 1214). It should be noted, that as explained above selection circuitry 1216 (which may correspond to selection circuitry 318 (FIG. 3)) may include an internal clock to monitor and/or adjust the synchronization scheme of optical user device 1214 and user equipment 1208, 1210, and/or 1212 as necessary.

Thus, in a series of four frames (e.g., corresponding to four consecutive frames of multiplexed media asset 1206), the media guidance application (e.g., via selection circuitry 1216) synchronizes optical user device 1214 and user equipment 1208, 1210, and/or 1212 such that if a user wishes to view supplemental content, frame "A1" is presented when the optical user device is performing an open operation, and frame "B1" is presented when the optical user device is performing a close operation. The synchronization further causes frame "A2" to be presented when the optical user device is performing a close operation, and frame "B2" to be presented when the optical user device is performing a close operation.

Furthermore, as multiplexed media asset 1206 represents a combination of asset 1202 and 1204, multiplexed media asset 1206 alternates with one frame including the media asset only and one frame including the media asset plus the supplemental content. For example, multiplexing system 1200 begins with a set of frames corresponding to two identical media assets. However, asset 1202 includes supplemental content (e.g., subtitles) and media asset 1204 does not include supplemental content.

In addition, the media guidance application (e.g., via control circuitry 304 (FIG. 3)) synchronizes optical user device 1214 to selection circuitry 1216 such that multiplexed media asset 1206 corresponds to the synchronization scheme of optical user device 1214. For example, if optical user device includes an active shutter system, the synchronization scheme (e.g., the rate of opening and closing shutters on the optical user device) now corresponds to the refresh rate of multiplexed media asset 1206. Accordingly, if a user wishes to see the supplemental content, the media guidance application may block (e.g., as described in relation to FIGS. 9A-D) the media content without the supplemental content and present the media content with the supplemental content.

Alternatively or additionally, in some embodiments, the media guidance application may synchronize optical user device 1214 and selection circuitry 1216 by adjusting the polarization of the media assets being displayed by the user equipment device such that one frame is polarized ninety degrees to the other. As selection circuitry 1216 is creating multiplexed media asset 1206, the media guidance application may then determine which frame to polarize based on how optical user device 1214 is polarized and whether or not the user wishes to view the supplemental content. If the user wishes to see the supplemental content, the media guidance application may polarize the media content with the supplemental content such that it corresponds to the polarization of optical user device 1214. Alternatively, if the user does not wish to see the supplemental content, the media guidance application may polarize the media content without the supplemental content such that it corresponds to the polarization of optical user device 1214.

It should also be noted that while the current synchronization scheme involves multiplexing two media assets, any number of media asset may be multiplexed according to this system. In such a case, the media guidance application may synchronize the refresh rate accordingly (e.g., tripling the refresh rate is three media assets are multiplexed, quadrupling the refresh rate is four media assets are multiplexed, etc.).

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted, the systems and/or methods described above may be applied to, or used in accordance with, other systems and/or methods.

What is claimed is:

1. A method for presenting supplemental content in media assets, the method comprising:

generating, by control circuitry, a display of media content on a holographic film comprising photorefractive polymers, wherein a single instance of the media content includes a plurality of frames, and wherein a first frame of the plurality of frames includes first supplemental content and a second frame of the plurality of frames includes second supplemental content;

selecting, by the control circuitry, based on a user criterion, to present the first supplemental content to a user;

in response to the selection, determining, by the control circuitry, a viewing direction in which the selected first supplemental content is presented to the user;

determining, by the control circuitry, a default frame of the single instance of the media content associated with the determined viewing direction;

updating the holographic film by substituting, by the control circuitry, only the default frame of the single instance of the media content associated with the determined viewing direction with a frame associated with the selected first supplemental content; and generating, by the control circuitry, a display of the selected first supplemental content at the determined viewing direction simultaneously with the media content.

2. The method of claim 1, wherein the viewing direction represents a pair of angles associated with a gaze point of a user.

3. The method of claim 1, wherein each of the plurality of frames of the media content forms a hologram.

4. The method of claim 1, wherein the selected first supplemental content appears to the user to be overlaid on the media content.

5. The method of claim 1, wherein the selected first supplemental content is only viewable by the user from the viewing direction.

6. The method of claim 1, further comprising:

determining, by the control circuitry, a first series of frames of the plurality of frames that corresponds to the first supplemental content; and presenting, by the control circuitry, the first series of frames at the determined viewing direction.

7. The method of claim 1, wherein the first supplemental content includes subtitles.

8. The method of claim 1, wherein the user criterion indicates a media interest of the user, a user selection indicating a desire to view the first supplemental content, or a recommendation for the first supplemental content generated from a remote location.

9. The method of claim 1 further comprising selecting by the control circuitry the first supplemental content based on cross-referencing, by the control circuitry, the first supplemental content and the second supplemental content with a database associated with user preferences to determine whether the first supplemental content or the second supplemental content corresponds to the user preferences.

10. The method of claim 1, wherein the selected first supplemental content is presented, by the control circuitry, to the user at the determined viewing direction while the second supplemental content is presented, by the control circuitry, to a different user at a different determined viewing direction.

11. A system for presenting supplemental content in media assets, the system comprising:

holographic film comprising photorefractive polymers; and control circuitry configured to:

generate a display of media content on the holographic film, wherein a single instance of the media content includes a plurality of frames, and wherein a first frame of the plurality of frames includes first supplemental content and a second frame of the plurality of frames includes second supplemental content;

select, based on a user criterion, to present the first supplemental content to a user;

in response to the selection, determine a viewing direction in which the selected first supplemental content is presented to the user;

determine a default frame of the single instance of the media content associated with the determined viewing direction;

update the holographic film by substituting only the default frame of the single instance of the media content associated with the determined viewing direction with a frame associated with the selected first supplemental content; and generate a display of the selected first supplemental content at the determined viewing direction simultaneously with the media content.

12. The system of claim 11, wherein the viewing direction represents a pair of angles associated with a gaze point of a user.

13. The system of claim 11, wherein each of the plurality of frames of the media content forms a hologram.

14. The system of claim 11, wherein the selected first supplemental content appears to the user to be overlaid on the media content.

15. The system of claim 11, wherein the selected first supplemental content is only viewable by the user from the viewing direction.

16. The system of claim 11, wherein the control circuitry is further configured to:

determine a first series of frames of the plurality of frames that corresponds to the first supplemental content; and present the first series of frames at the determined viewing direction.

17. The system of claim 11, wherein the first supplemental content includes subtitles.

18. The system of claim 11, wherein the user criterion indicates a media interest of the user, a user selection indicating a desire to view the first supplemental content, or a recommendation for the first supplemental content generated from a remote location.

19. The system of claim 11, wherein the control circuitry is further configured to select the first supplemental content based on a cross-reference of the first supplemental content and the second supplemental content with a database associated with user preferences to determine whether the first supplemental content or the second supplemental content corresponds to the user preferences.

20. The system of claim 11, wherein the selected first supplemental content is presented to the user at the determined viewing direction while the second supplemental content is presented to a different user at a different determined viewing direction.

* * * * *